US012602796B2

(12) United States Patent
Gronau

(10) Patent No.: US 12,602,796 B2
(45) Date of Patent: Apr. 14, 2026

(54) SYSTEM, DEVICE, AND METHODS FOR DETECTING AND OBTAINING INFORMATION ON OBJECTS IN A VEHICLE

(71) Applicant: Gentex Corporation, Zeeland, MI (US)

(72) Inventor: Yuval Gronau, Ramat Hasharon (IL)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/607,853

(22) Filed: Mar. 18, 2024

(65) Prior Publication Data

US 2024/0265554 A1      Aug. 8, 2024

Related U.S. Application Data

(63) Continuation of application No. 17/431,381, filed as application No. PCT/IL2020/050174 on Feb. 17, 2020, now Pat. No. 11,935,248.

(Continued)

(51) Int. Cl.
| | |
|---|---|
| *G06T 7/246* | (2017.01) |
| *B60W 50/00* | (2006.01) |

(Continued)

(52) U.S. Cl.
CPC ......... *G06T 7/246* (2017.01); *B60W 50/0098* (2013.01); *G06T 7/20* (2013.01);

(Continued)

(58) Field of Classification Search
None
See application file for complete search history.

(56) References Cited

U.S. PATENT DOCUMENTS

| | | | | |
|---|---|---|---|---|
| 2010/0265074 | A1* | 10/2010 | Namba | G06V 10/85 340/576 |
| 2013/0250050 | A1* | 9/2013 | Kanaujia | H04N 13/106 348/42 |

(Continued)

FOREIGN PATENT DOCUMENTS

EP            2201496  B1      5/2018

*Primary Examiner* — Delomia L Gilliard
(74) *Attorney, Agent, or Firm* — Price Heneveld LLP; Brian James Brewer

(57)            ABSTRACT

System and methods are provided for detecting occupancy state in a vehicle including analyzing data of the interior passenger compartment to yield at least one probability of a current occupancy state of the vehicle and further analyzing additional data of the interior passenger compartment to yield predicted probabilities of the occupancy state of the vehicle, wherein each probability of the predicted probabilities relate to the probability of changing the current occupancy state to different occupancy state combining the current at least one probability of the current occupancy state with the predicted probabilities of the occupancy state to yield an updated probability of an updated occupancy state of the vehicle; determining the current occupancy state based on the updated probability of an updated occupancy state of the vehicle and generating an output to control one or more devices or applications based on the determined occupancy state.

20 Claims, 16 Drawing Sheets

Related U.S. Application Data

(60) Provisional application No. 62/806,840, filed on Feb. 17, 2019.

(51) Int. Cl.

| | |
|---|---|
| *G06T 7/20* | (2017.01) |
| *G06T 7/70* | (2017.01) |
| *G06V 10/44* | (2022.01) |
| *G06V 10/764* | (2022.01) |
| *G06V 10/82* | (2022.01) |
| *G06V 20/59* | (2022.01) |
| *G06V 40/10* | (2022.01) |
| *G06V 40/16* | (2022.01) |

(52) U.S. Cl.
CPC .............. *G06T 7/70* (2017.01); *G06V 10/454* (2022.01); *G06V 10/764* (2022.01); *G06V 10/82* (2022.01); *G06V 20/593* (2022.01); *G06V 20/597* (2022.01); *G06V 40/10* (2022.01); *G06V 40/161* (2022.01); *B60W 2540/223* (2020.02); *B60W 2540/229* (2020.02); *G06T 2207/20076* (2013.01); *G06T 2207/20084* (2013.01); *G06T 2207/30196* (2013.01); *G06T 2207/30232* (2013.01); *G06T 2207/30268* (2013.01)

(56) References Cited

U.S. PATENT DOCUMENTS

| | | | | |
|---|---|---|---|---|
| 2014/0098093 | A2* | 4/2014 | Haker ................... | G06V 40/28 345/420 |
| 2014/0219550 | A1* | 8/2014 | Popa ..................... | G06V 20/42 382/154 |
| 2015/0331105 | A1* | 11/2015 | Bell ...................... | G01S 7/4808 356/4.01 |
| 2016/0019777 | A1 | 1/2016 | Peterson et al. | |
| 2016/0272141 | A1 | 9/2016 | Ohmura | |
| 2022/0067410 | A1* | 3/2022 | Raz ..................... | A61B 5/7264 |

* cited by examiner

300

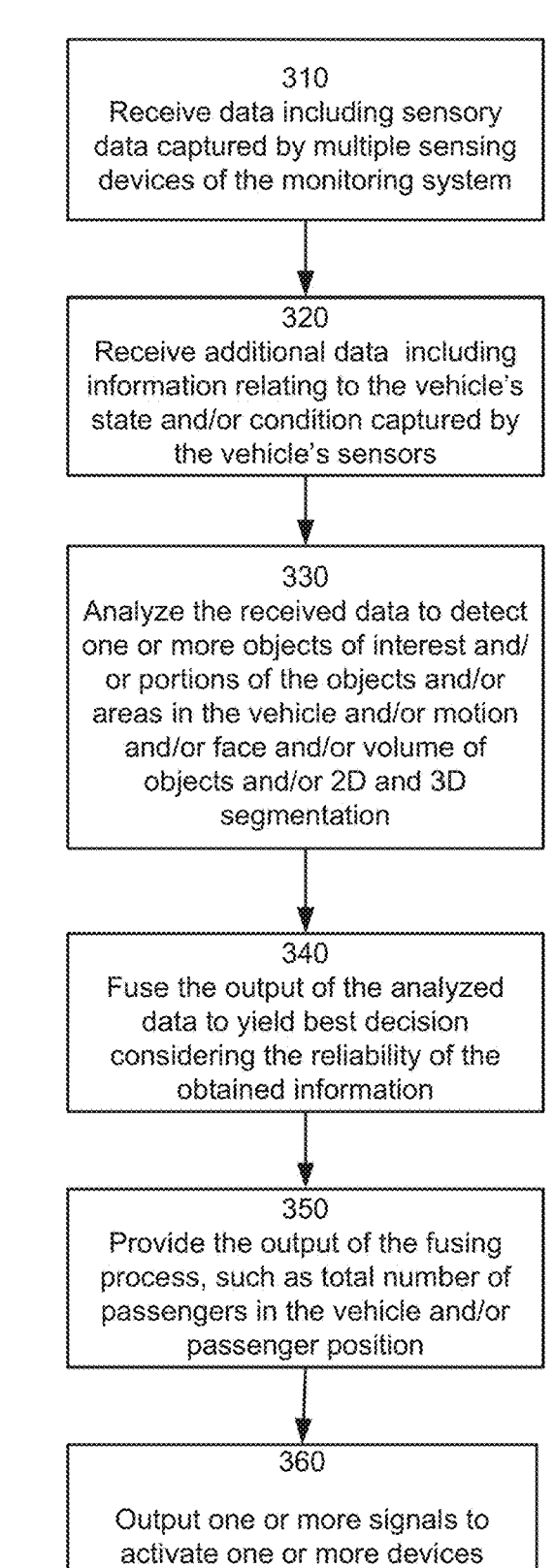

310
Receive data including sensory data captured by multiple sensing devices of the monitoring system

320
Receive additional data including information relating to the vehicle's state and/or condition captured by the vehicle's sensors

330
Analyze the received data to detect one or more objects of interest and/or portions of the objects and/or areas in the vehicle and/or motion and/or face and/or volume of objects and/or 2D and 3D segmentation

340
Fuse the output of the analyzed data to yield best decision considering the reliability of the obtained information

350
Provide the output of the fusing process, such as total number of passengers in the vehicle and/or passenger position

360
Output one or more signals to activate one or more devices

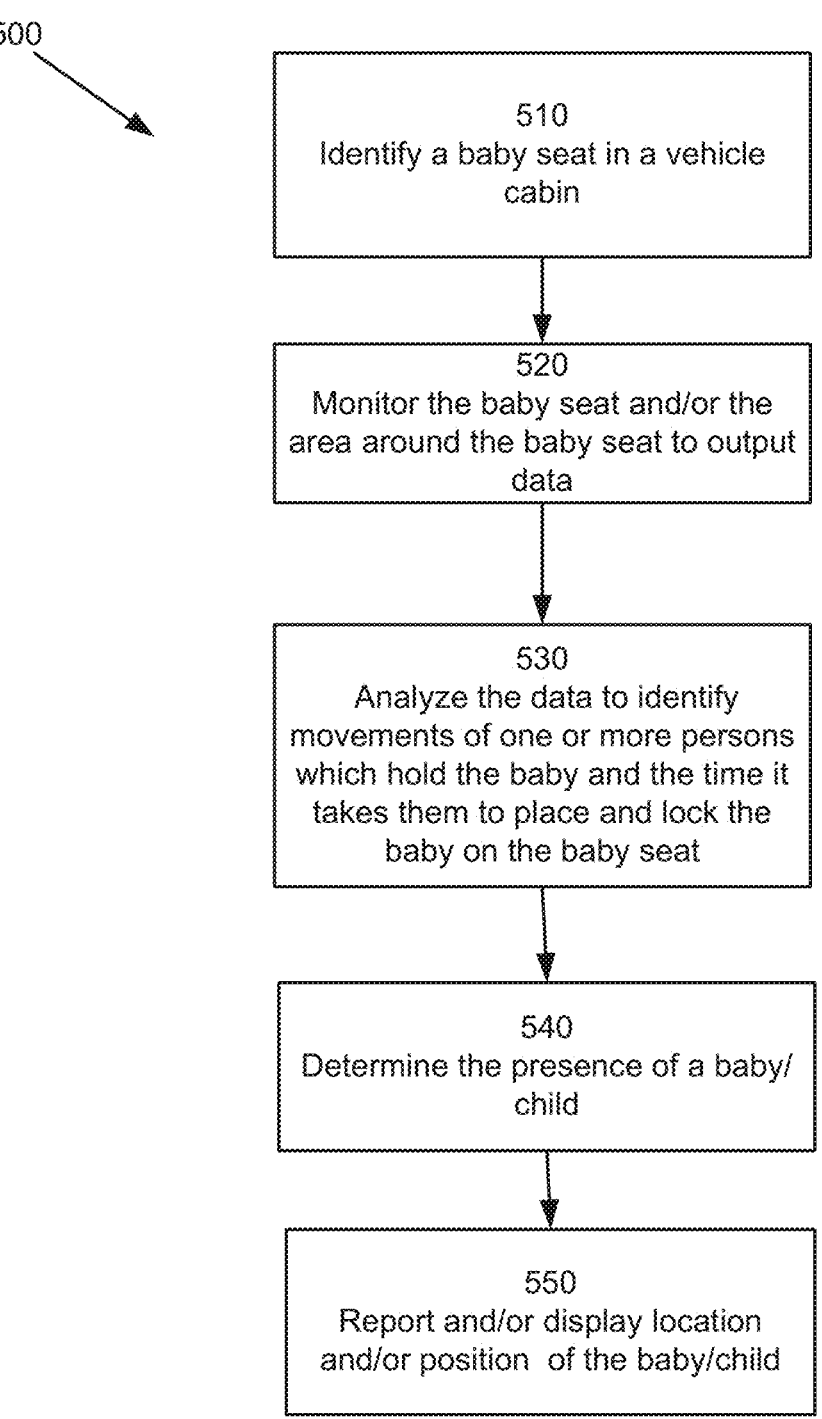

500

510
Identify a baby seat in a vehicle cabin

520
Monitor the baby seat and/or the area around the baby seat to output data

530
Analyze the data to identify movements of one or more persons which hold the baby and the time it takes them to place and lock the baby on the baby seat 540
Determine the presence of a baby/child 550
Report and/or display location and/or position of the baby/child

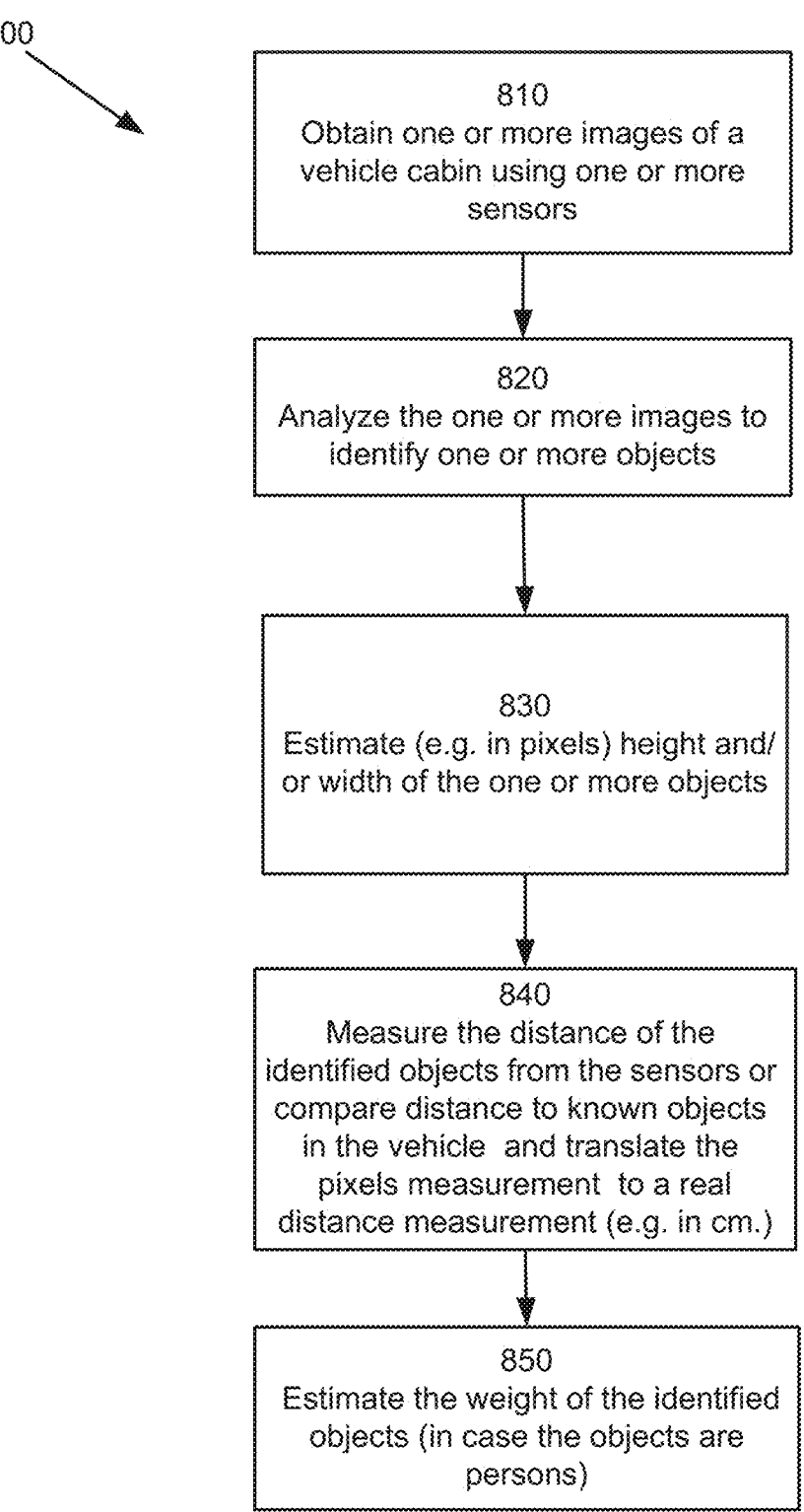

810
Obtain one or more images of a vehicle cabin using one or more sensors

820
Analyze the one or more images to identify one or more objects

830
Estimate (e.g. in pixels) height and/ or width of the one or more objects

840
Measure the distance of the identified objects from the sensors or compare distance to known objects in the vehicle and translate the pixels measurement to a real distance measurement (e.g. in cm.)

850
Estimate the weight of the identified objects (in case the objects are persons)

Figure 8A

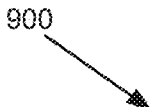

900

Obtain data including two or more images comprising a sequence of 2D and 3D images comprising one or more occupants of the vehicle cabin
910

Apply a pose detection algorithm on each of the obtained sequence of 2D images to yield a 2D skeleton representation of said one or more occupants;
920

Analyze the obtained sequence of 3D images to generate a depth map representation of the one or more occupants
930

Combine the depth maps of each 3D image of said sequence of 3D images with the 2D skeleton representation of said one or more occupants to yield at least one 3D skeleton model for each one of the detected one or more occupants
940 generate a prediction model(e.g. stochastic prediction model) based on the the at least one 3D skeleton model of the detected occupants to detect the occupancy state of the vehicle
950

Figure 9A

960

Obtain data including one or more images comprising  2D  images of one or more occupants  in the vehicle cabin
970

Apply a pose detection  algorithm on each of the obtained  2D images to yield at least one 2D skeleton representation of the one or more detected  occupants
980 generate  a stochastic prediction model based on the 2D skeleton representations to detect the occupancy state of the vehicle or one or more features of the occupants
990

Figure 9B

SYSTEM, DEVICE, AND METHODS FOR DETECTING AND OBTAINING INFORMATION ON OBJECTS IN A VEHICLE

CROSS-REFERENCE

This is a continuation application of U.S. patent application Ser. No. 17/431,381, entitled "SYSTEM, DEVICE, AND METHODS FOR DETECTING AND OBTAINING INFORMATION ON OBJECTS IN A VEHICLE," filed on Aug. 16, 2021, by Yuval Gronau, which is a National Stage Application under 35 U.S.C. § 371 of International Application No. PCT/IL2020/050174, filed on Feb. 17, 2020, entitled "SYSTEM, DEVICE, AND METHODS FOR DETECTING AND OBTAINING INFORMATION ON OBJECTS IN A VEHICLE," which claims priority to U.S. Provisional Application Ser. No. 62/806,840, filed on Feb. 17, 2019, entitled "SYSTEM, DEVICE, AND METHODS FOR DETECTING AND OBTAINING INFORMATION ON OBJECTS IN A VEHICLE," the disclosures of which are incorporated herein by reference in their entirety.

TECHNICAL FIELD

The present invention, in some embodiments thereof, relates to obtaining information on objects in a scene, and, more specifically, but not exclusively, to detecting and obtaining information on hidden objects such as occupants setting in a vehicle cabin.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Object detection including motion and/or position detection is a highly challenging task and a lot of research is therefore invested to develop and deploy tools, algorithms, and methods for accurately detecting and classifying objects present in a scene.

Specifically, vehicle in-cabin driver and passenger sensing require a high level of accuracy, especially for safety related applications such as seat belt reminder (SBR), out of position indication (OOP) for example for airbags suppression and driver monitoring system (DMS) for driver's alert. Additionally, today's advanced driver assistant systems (ADAS) and autonomous cars require precise information about the driver and passengers in the vehicle cabin.

Moreover, to reach a high level of accuracy, the identification of one or more objects in a vehicle cabin sometimes applies to objects which may not be easily identified such as hidden objects which are blocked by one or more of the vehicle units such as the vehicle seats. Additionally, the required information regarding the objects applies not only to the object itself but also to its location and/or orientation in the passenger compartment. For example, a rear facing child seat is a different object than a forward facing child seat and an out-of-position adult can be a different object than a normally seated adult. For example, as illustrated in FIG. 1A the back interior section 120 of the vehicle 100 is blocked by the front driver seat 111 and the front passenger seat 130 and as a result hidden areas such as the back seats may not be monitored, especially when in the back seats a passenger, such as passenger 125 is leaning outside the seat position in such a way that he or she is obstructed by other objects such as the seats or headrests. In such cases, conventional monitoring methods which are based mainly on sensors mounted in the vehicle which require line of sight with the imaged targets, such as sensors positioned in proximity to the vehicle's front mirror, would fail to identify the passenger and/or the passenger's body and face.

For example, some solutions that are currently used today include installing a monitoring system in the front part of the car, for example above or below the vehicle cabin front mirror. These monitoring systems, in many cases, have a limited field of view resulting in a low reliability level, as many hidden areas in the cabin car, such as the back seats and other sections are blocked by the front seats or other obstacles and as a result, may not be viewed by the monitoring system and detected.

Additionally, prior monitoring systems detection is typically limited in cases where for example the vehicle's passengers are partially covered. Moreover, these monitoring systems may also provide wrong detections for nonstandard positions of the passengers such as in cases where one or more passengers are leaning outside the seat position or when body parts invade neighboring seats.

Furthermore, prior monitoring systems require significant and costly processing resources and typically the needed processing time for training the monitoring systems and the processing units are long resulting in resource dissipation.

Other prior solutions include embedding a number of sensors in various locations in the vehicle cabin, for example in the rear section of the car cabin (e.g. in the ceiling of the vehicle and in the doors) can be less than ideal in at least some respects. These prior systems require using many sensors and are therefore expansive, complicated, large difficult and complicated to install in the vehicle, and the sensors optics require more alignment than would be ideal.

In light of the above, an improved monitoring system, device and method for sensing and detecting objects in a vehicle interior, which overcomes at least some of the above-mentioned deficiencies of the prior detection would be beneficial. Ideally, such systems would be compact, integrated with other devices and systems such as a vehicle's systems and units, sufficiently rugged and low in cost to be practical for end-user sensing of objects, convenient and convenient to use.

SUMMARY OF THE INVENTION

Embodiments of the present disclosure provide improved sensing, detecting and obtaining information on hidden objects such as occupants setting in a vehicle cabin. According to a first embodiment, there is provided a method for detecting occupancy state in a vehicle having an interior passenger compartment, the method comprising: using at least one processor to: analyze data of said interior passenger compartment to yield at least one probability of a current occupancy state of said vehicle; analyze additional data of said interior passenger compartment to yield predicted probabilities of said occupancy state of said vehicle, wherein each probability of said predicted probabilities relate to the probability of changing said current occupancy state to different occupancy state; combine said current at least one probability of the current occupancy state with said predicted probabilities of said occupancy state to yield an updated probability of an updated occupancy state of said vehicle; determine said current occupancy state based on said updated probability of an updated occupancy state of said vehicle; generate an output to control one or more devices or applications based on the determined occupancy state.

In many embodiments, the at least one probability of a current occupancy state of said vehicle is in the form of a probability vector and the predicted probabilities of said occupancy state of said vehicle are in the form of a matrix.

In many embodiments, the matrix is a Markov matrix.

In many embodiments, the probability vector is multiplied by the matrix to yield the updated probability of an updated occupancy state of said vehicle.

In many embodiments, the data comprises at least one image of said interior passenger compartment captured by at least one sensing device mounted in said vehicle.

In many embodiments, the at least one image is analyzed using deep neural network (DNN) to determine said current occupancy state.

In many embodiments, the updated occupancy state is estimated based on a weighted average of the predicted probabilities of said occupancy state and the at least one probability of a current occupancy state.

In many embodiments, the weighted average is measured using Infinite Impulse Response (IIR) filters.

In many embodiments, the additional data is obtained from one or more of: prior knowledge of possible movements in said vehicle; 2D or 3D images of the interior passenger compartment; RF images; identified vibrations of one or more objects; identified micro-vibrations; speckle pattern analysis.

In many embodiments, the additional data comprises one or more of: vehicle speed; vehicle acceleration; gear position; fuel and/or vehicle units' status; vehicle doors state; vehicle windows state; which door or window is closed or open; information relating to the vehicle seats; seats belt status, air condition state; vehicle interior temperature level, info relating to multimedia; face detection data; motion detection data; depth maps.

In many embodiments, one or more devices or applications are one or more devices or applications of said vehicle.

In many embodiments, the additional data is obtained by a monitoring system comprising sensors of multiple modalities.

In many embodiments, the monitoring system is mounted in a dashboard or instrument panel or ceiling of the vehicle.

In many embodiments, the determined occupancy state further comprises identification of the total number of passengers in the vehicle or the position of the identified passengers.

In many embodiments, the position identification further comprises identifying whether the passengers are sitting straight or leaning to the side or forward.

In many embodiments, the predicted probabilities of said occupancy state of said vehicle are continuously updated.

According to a second embodiment there is provided a system for detecting occupancy state in a vehicle having an interior passenger compartment, the system comprising: a monitoring system comprising at least one sensing device configured to capture images of the vehicle interior passenger compartment; and at least one processor, which is in communication with said monitoring system, wherein said at least one processor is configured to: analyze said captured images of said interior passenger compartment to yield at least one probability of a current occupancy state of said vehicle; analyze additional data of said interior passenger compartment to yield predicted probabilities of said occupancy state of said vehicle, wherein each probability of said predicted probabilities relate to the probability of changing said current occupancy state to a different occupancy state; combine said current at least one probability of the current occupancy state with said predicted probabilities of said occupancy state to yield an updated probability of an updated occupancy state of said vehicle; determine said current occupancy state based on said updated probability of an updated occupancy state of said vehicle; generate an output to control one or more devices or applications based on the determined occupancy state.

In many embodiments, the additional data comprises one or more of: prior knowledge; optical flow.

In many embodiments, the prior knowledge may include one or more of: the vehicle speed; the vehicle acceleration; gear position; fuel and/or vehicle units' status; vehicle doors state; vehicle windows state; which door or window is closed or open; information relating to the vehicle seats; seats belt status, air condition state; vehicle interior temperature level, info regarding multimedia.

In many embodiments, the monitoring system comprises an illumination source.

In many embodiments, the monitoring system is configured to detect at said interior passenger compartment at least one occupant.

In many embodiments, the monitoring system is further configured to detect one or more of said at least one occupant face; motion; pose.

In many embodiments, the monitoring device comprises a plurality of sensing devices of different types.

In many embodiments, the plurality of sensing devices are selected from a group consisting of: Radio Frequency (RF) sensor; face detector; motion detector; Ultrasonic sensor, acoustic sensor, pressure sensor, thermal detector.

In many embodiments, the one or more devices or applications are said vehicle one or more devices or applications and are selected from the group consisting of: one or more alarms; vehicle air-bags; HVAC (Heating, Ventilating, and Air Conditioning) systems; vehicle's sound system; vehicle's electronic stabilization control (ESC); infotainment system; vehicle security system; seat belt reminder (SBR) systems; out of position indication (OOP) system; driver monitoring system (DMS); advanced driver assistant systems (ADAS).

In many embodiments, the output is an output signal configured to operate one or more of the following actions: indicating one or more occupants for safety; tuning the vehicles systems according to the updated occupancy state to active an alarm to indicate of occupancy with unbuckled seatbelt; suppress airbags for out of position; optimizing the vehicle's sound system; optimizing vehicle's electronic stabilization control (ESC); detecting occupant in locked vehicle and automatically open one or more of the vehicle's windows or doors; adjusting one or more multimedia systems; detecting an intruder entering and/or attempting to enter the vehicle cabin; verifying that the driver is awake and concentrated on driving the vehicle.

According to a third embodiment there is provided a non-transitory computer readable storage medium storing computer program instructions, the computer program instructions when executed by a computer processor causes the processor to perform the steps of: receiving sensory data of an interior passenger compartment of a vehicle, wherein said sensory data is captured by one or more sensing devices; receive additional data of said interior passenger compartment wherein said additional data comprises information relating to the vehicle state or vehicle units state;

analyzing the received sensory data and the received additional data to extract detailed information on said one or more objects or said interior passenger compartment; fusing the extracted detailed information to yield the best decision model said best decision model is configured to consider the reliability of the detailed information.

In many embodiments, the extracted detailed information comprises one or more of the vehicle occupancy state or details on the one or more objects of interest or portions of the objects/or areas in the vehicle.

In many embodiments, the additional data is obtained by said vehicle sensing devices or other sensors.

In many embodiments, the extract detailed information comprises multiple data inputs of different modalities and said fusing comprises fusing said multiple data inputs to yield a stochastic model of one or more predicted occupancy states probabilities and continuously updating over time a current state probability based on predicted occupancy states probabilities.

According to a fourth embodiment, there is provided a method for measuring the actual length of one or more objects in a vehicle cabin, the method comprising: obtaining one or more images of the vehicle cabin by at least one image sensor; analyzing the obtained one or more images, by at least one processor, to identify one or more objects in the vehicle cabin; estimating in pixels units the length of the identified objects in the obtained one or more images using one or more neural networks; measuring the distance of the identified object from the at least one image sensor or compare the distance of the one or more identified objects to known objects in the vehicle to yield an actual measure of length of the one or more objects.

In many embodiments, one or more objects are one or more persons.

In many embodiments, the measured length comprises the height and width of the one or more persons.

In many embodiments, a weight of the one or more persons is measured based on the measured height and width.

In many embodiments, one or more neural networks are used to measure the body portions of the one or more persons.

According to a fifth embodiment, there is provided a method for monitoring a baby seat and obtaining information on the baby seat in a vehicle cabin, the method comprising: identifying a baby seat at the vehicle cabin; monitoring the baby seat or the area around the baby seat using a monitoring system to yield data on the baby seat or the area around the baby seat; analyzing the data to identify movements of one or more persons which hold the baby and data including the measured time it takes the one or more persons to place and lock the baby on the baby seat; determine the presence of the baby based on the analyzed data.

In many embodiments, the data is analyzed using a fusing algorithm.

In many embodiments, the method further comprising reporting or displaying the location or position of the baby.

According to a sixth embodiment there is provided a system for detecting the presence of one or more objects in a vehicle having an interior passenger compartment, the system comprising: a monitoring system configured to monitor areas and objects at the vehicle interior passenger compartment, said monitoring system comprising: one or more sensing devices; one or more processors, said one or more processors are configured to: receive sensory data of said interior passenger compartment wherein said sensory data is captured by said one or more sensing devices; receive additional data of said interior passenger compartment wherein said additional data is obtained by said vehicle sensors; analyze the received sensory data and the received additional data to extract detailed information on said one or more objects and/or said interior passenger compartment; fuse the extracted detailed information to yield the best decision considering the reliability of the detailed information.

In many embodiments, the detailed information comprises at least one probability of a current occupancy state of said vehicle and wherein said fusing comprises combining said at least one probability of a current occupancy state with predicted probabilities of said occupancy state to yield an updated probability of an updated occupancy state of said vehicle.

In many embodiments, the method comprising generating an output to control one or more devices or applications of said vehicle based on the determined occupancy state.

In many embodiments, one or more objects are located in the rear section in the passenger compartment.

In many embodiments, the monitoring system is mounted in a dashboard or instrument panel or ceiling of the vehicle such that information about the one or more objects located in the rear section in the passenger compartment of the vehicle is obtained.

In many embodiments, the wherein the detailed information includes one or more of an estimation of the probability that one or more seats in the vehicle are occupied and/or the total number of passengers in the vehicle and/or the position of the identified passengers.

In many embodiments, the position identification further comprises identifying whether the passengers are sitting straight or leaning to the side or forward.

In many embodiments, the wherein said sensory data comprises one or more of: 2D or 3D images of the interior passenger compartment; RF images; identified vibrations of one or more objects; identified micro-vibrations; speckle pattern analysis.

In many embodiments, the wherein said additional data comprises one or more of: vehicle speed; vehicle acceleration; gear position; fuel and/or vehicle units' status; vehicle doors state; vehicle windows state; which door or window is closed or open; information relating to the vehicle seats; seats belt status, air condition state; vehicle interior temperature level, info re multimedia.

In many embodiments, the wherein said multiple different sensing devices comprise one or more of 2D imaging devices and/or a 3D imaging device and/or RF imaging devices and/or vibration sensors.

In many embodiments, the wherein said vehicle sensors are selected from a group consisting of: vehicle engine sensors; seat sensors; door sensors; seat buckle sensors; car stability sensors; window sensors.

According to a seventh embodiment, there is provided a method for detecting the number of occupants in a vehicle having an interior passenger compartment, the method comprising: using at least one processor to: obtain data including one or more images of said occupants; apply one or more pose detection algorithms on said one or more images to yield one or more skeleton models, respectively, for each or one or more occupants of said occupants; generate a prediction model based on one or more skeleton models to detect the number of occupants in said vehicle.

In many embodiments, the one or more images comprise two-dimensional (2D) images and wherein said one or more skeleton models are 2D skeleton models.

In many embodiments, the obtained data comprise two or more images and wherein said two or more images comprise two-dimensional (2D) images and three-dimensional (3D) images of said interior passenger compartment and wherein said processor is configured to: analyze the 3D images to generate one or more depth map representations of the occupants; combine the depth map representations with the generated depth map representations to yield one or more 3D skeleton models of said occupants; and analyze said one or more 3D skeleton models to detect the number of occupants in said vehicle.

In many embodiments, the processor is configured to analyze the skeleton models based on predefined filtering criteria to remove invalid skeleton models.

In many embodiments, the analysis of said one or more skeleton models to detect the number of occupants in said vehicle comprises inserting the generated skeleton models to the prediction model, said prediction model is configured to estimate the number of occupants in time (t) based on current and previous (t−1) occupancy measurements.

In many embodiments, the prediction model is a fusing algorithm.

In many embodiments, the fusing algorithm comprises combining two or more types of data inputs.

In many embodiments, the two or more types of data inputs include said one or more skeleton models and one or more of optical flow data or face detection data.

In many embodiments, the prediction model is a stochastic model.

In many embodiments, the stochastic model is in the form of a Markov chain, or Markov matrix.

In many embodiments, the at least one probability of a current occupancy state of said vehicle is in the form of a probability vector and the predicted probabilities of said occupancy state of said vehicle are in the form of matrix.

In many embodiments, the processor is further configured to: analyze additional data of said interior passenger compartment to yield predicted probabilities of said occupancy state of said vehicle, wherein each probability of said predicted probabilities relate to the probability of changing said current occupancy state to different occupancy state; combine said current at least one probability of the current occupancy state with said predicted probabilities of said occupancy state to yield an updated probability of an updated occupancy state of said vehicle; determine said current occupancy state based on said updated probability of an updated occupancy state of said vehicle; and generate an output to control one or more devices or applications based on the determined occupancy state.

In many embodiments, the at least one probability of a current occupancy state of said vehicle is in the form of a probability vector and the predicted probabilities of said occupancy state of said vehicle are in the form of matrix.

In many embodiments, the probability vector is multiplied by said matrix to yield the updated probability of an updated occupancy state of said vehicle.

In many embodiments, the additional data is obtained from one or more of: prior knowledge of possible movements in said vehicle; 2D or 3D images of the interior passenger compartment; RF images; identified vibrations of one or more objects; identified micro-vibrations; speckle pattern analysis.

According to an eighth embodiment there is provided a method for detecting the number of occupants in a vehicle having an interior passenger compartment, the method comprising: using at least one processor to: obtain data including two or more images of said occupants; apply one or more face detection or face recognition algorithms to identify said occupants; analyze said identification of said occupants to detect the number of occupants in said vehicle.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 3 is a high level schematic flowchart of a method for monitoring areas or object in a vehicle, in accordance with some embodiments of the present disclosure.

FIG. 5B shows a flowchart of a method for identifying a baby seat located in the rear section of a vehicle and alert in case a baby or child was forgotten at the baby seat, in accordance with some embodiments of the present disclosure;

FIG. 8A shows a flowchart of a method for measuring height and/or weight of an object in a vehicle cabin, in accordance with some embodiments;

FIG. 9A is a flow diagram illustrating steps of detecting occupancy state, including identifying objects, such as hidden objects in a vehicle cabin and in some cases providing information on the identified objects, using a 3D skeleton model, in accordance with embodiments; and FIG. 9B is a flow diagram illustrating steps of detecting occupancy state, including identifying objects, such as hidden objects in a vehicle cabin and in some cases providing information on the identified objects, using a 3D skeleton model, in accordance with embodiments.

DETAILED DESCRIPTION OF THE INVENTION

Figure 1A:
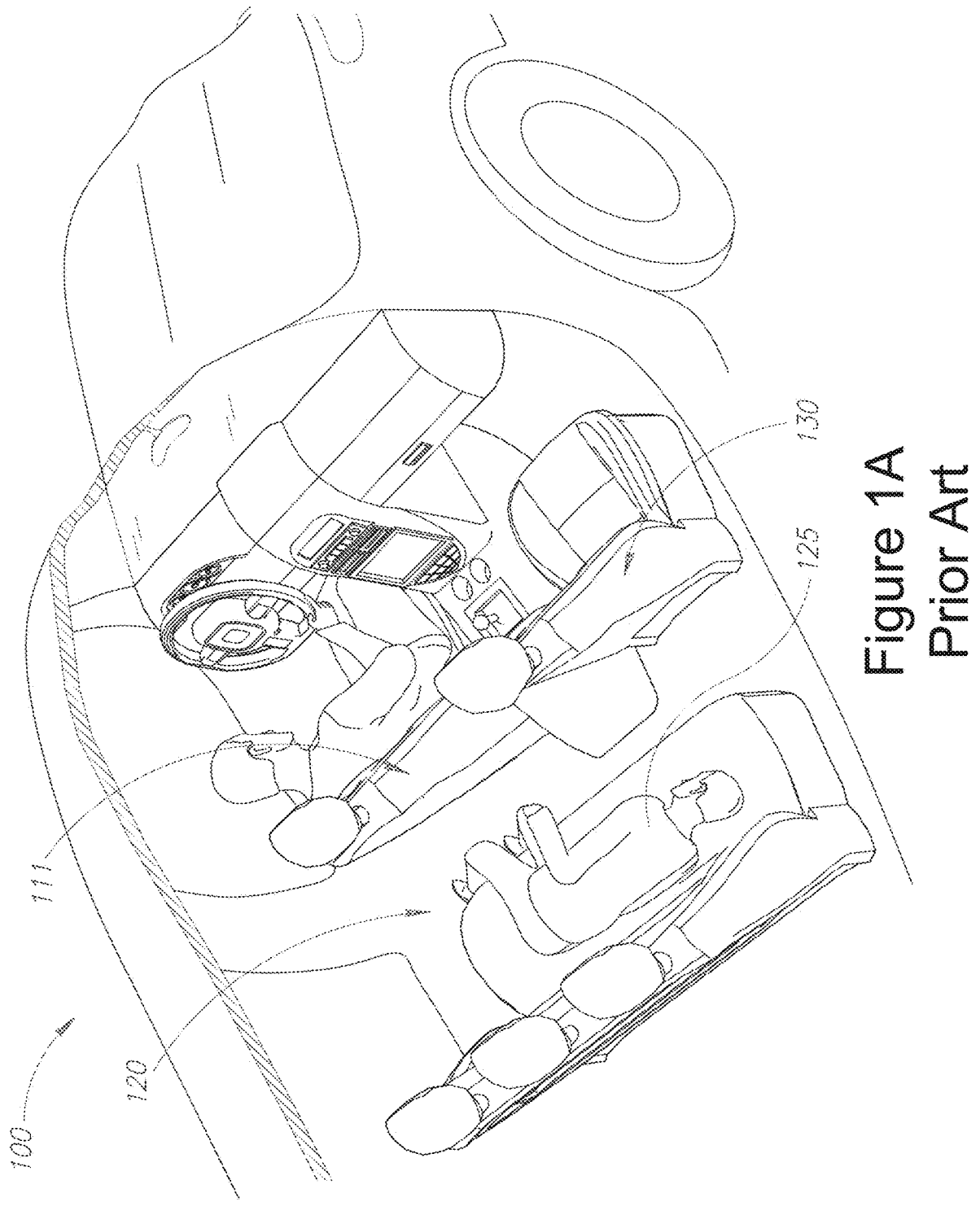
FIG. 1A shows a schematic diagram of an interior section of a vehicle wherein the back seats may not be monitored, in accordance with the prior art.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

The configurations disclosed herein can be combined in one or more of many ways to provide improved monitoring and detection methods, systems and devices. One or more components of the configurations disclosed herein can be combined with each other in many ways.

In accordance with embodiments, there are provided devices, systems and methods for monitoring areas to identify one or more objects within a vehicle which are for example not in the line of sight, e.g. which are not visible to a monitoring system positioned in the vehicle. In some cases, the objects may be located at hidden areas in the vehicle, for example, the objects may be located at the back section of the vehicle (e.g. the vehicle's cabin), and/or at one or more spaces in the passenger compartment behind the driver, or at the vehicle's back seats (e.g. at the second, third or last raw of seven or more seaters vehicle). The methods and systems may identify and determine that the identified object is an occupant, the shape and/or pose and/or position of the occupant. The methods and systems may include detecting the presence and/or positions of the objects in the vehicle.

In accordance with further embodiments, there are provided devices, systems and methods for determining an occupancy state and/or detect one or more objects in a vehicle by obtaining multiple data inputs including various information of the vehicle, for example from different multiple sources, to generate a coherent and stable prediction module. The prediction module is configured and enabled to continuously, for example in real-time, update the occupancy state based on the multiple data inputs and using one or more probabilistic models. The obtained multiple data inputs including various information may be fused by using logistic regression methods, and/or neural networks and/or heuristic set of rules to optimize the performance of the fusing process in terms of object detection rate and false-positive rate.

In some cases, the devices systems and methods include fusing multiple data inputs, for example of different modalities or types and analyzing the fused data to yield a stochastic model (e.g. Markov chain) of one or more predicted occupancy states probabilities and continuously updated over time a current state probability (e.g. probability vector) based on predicted occupancy states probabilities.

In some cases, systems and methods as described herein including a monitoring system configured to monitor areas and objects at the vehicle interior passenger compartment. The monitoring system may include one or more sensing devices that may be in communications with one or more processors. The processors are configured to: receive sensory data of the interior passenger compartment and analyze the sensory data to determine at least one probability factor of an initiative occupancy state of the vehicle interior passenger compartment, for example in the form of a probability vector; receive additional data of said interior passenger compartment; analyze the received additional data to yield a stochastic model (e.g. Markov chain) comprising the probability of changing from one occupancy state to another occupancy state; estimating a predicted occupancy state based on the stochastic model; and determining an updated occupancy state by combining the predicted occupancy state and the initiative occupancy state.

In accordance with further embodiments, there are provided devices, systems and methods for detecting occupancy state in a vehicle having an interior passenger compartment, the method comprising: using at least one processor to: analyze data of said interior passenger compartment to yield at least one probability of a current occupancy state of said vehicle; analyze additional data of said interior passenger compartment to yield predicted probabilities of said occupancy state of said vehicle, wherein each probability of said predicted probabilities relate to the probability of changing said current occupancy state to a different occupancy state; combine said current at least one probability of the current occupancy state with said predicted probabilities of said occupancy state to yield an updated probability of an updated occupancy state of said vehicle; determine said current occupancy state based on said updated probability of an updated occupancy state of said vehicle; generate an output to control a device based on the determined occupancy state.

In accordance with embodiments, the methods and systems include continuously updating the occupancy state over time based on the additional data.

As used herein, like characters refer to like elements.

Advantageously method and systems in accordance with embodiments provide high energetic efficiency and short processing and acquisition time.

Prior to the detailed specification of the invention being set forth, it may be helpful to set forth definitions of certain terms that will be used hereinafter.

As used herein, the term "light" encompasses electromagnetic radiation having wavelengths in one or more of the ultraviolet, visible, or infrared portions of the electromagnetic spectrum.

To "identify" or "estimate" as used herein will generally mean to determine that an object belongs to a particular set or class. The class may be one containing, for example, rear facing baby seats, one containing human occupants, or human occupants not sitting in a rear facing baby seat, or humans in a certain height or weight range depending on the purpose of the system.

An "object" in a vehicle or an "occupying item" of a seat or "occupant" may be a living occupant such as a human or an animal, another living organism such as a plant, or an inanimate object such as a box or bag of groceries or an empty child seat.

"Determining occupancy" or "detecting occupancy" may include detecting an occupant and/or monitoring one or more occupants throughout the space e.g., counting occupants, tracking occupants, determining occupants' location in space, etc.

A "rear seat" or "back seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

An "image" or "optical image" will generally mean any type of image obtained using electromagnetic radiation including X-ray, ultraviolet, visual, infrared, Radio Frequency (RF).

"Vehicle" as used herein includes any container that is movable either under its own power or using power from another vehicle. It includes, but is not limited to, automobiles, trucks, railroad cars, ships, airplanes, trailers, shipping containers, barges, etc.

"Out-of-position" as used for an occupant will generally mean that the occupant, either the driver or a passenger, is sufficiently close to an occupant protection apparatus (e.g. airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant positioned too close to the airbag, this typically occurs when the occupant's head or chest is closer than some distance, such as about 5 inches, from the deployment door of the airbag module. The actual distance where airbag deployment should be suppressed depends on the design of the airbag module and is typically farther for the passenger airbag than for the driver airbag.

"Dynamic out-of-position" refers to the situation where a vehicle occupant, either driver or passenger, is in position at a point in time prior to an accident but becomes out-of-position, (that is, too close to the airbag module so that he or she could be injured or killed by the deployment of the airbag) prior to the deployment of the airbag due to pre-crash braking or other action which causes the vehicle to decelerate prior to a crash.

"Transducer" or "transceiver" as used herein will generally mean the combination of a transmitter and a receiver. In some cases, the same device will serve both as the transmitter and receiver while in other two separate devices adjacent to each other will be used. In some cases, a transmitter is not used and in such cases, transducer will mean only a receiver. Transducers include, for example, capacitive, inductive, ultrasonic, electromagnetic (antenna, CCD, CMOS arrays), electric field, weight measuring or sensing devices. In some cases, a transducer will be a single pixel either acting alone, in a linear or an array of some other appropriate shape. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases, a pair of such plates or antennas will comprise a transducer as determined by the context in which the term is used.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data. "Neural network" can also be defined as a system wherein the data to be processed is separated into discrete values which are then operated on and combined in at least a two-stage process and where the operation performed on the data at each stage is, in general, different for each of the discrete values and where the operation performed is at least determined through a training process. The operation performed is typically a multiplication by a particular coefficient or weight and by different operation, therefore is meant in this example, that different weight is used for each discrete value.

A "wave sensor" or "wave transducer" is generally any device which senses either ultrasonic or electromagnetic waves. An electromagnetic wave sensor, for example, includes devices that sense any portion of the electromagnetic spectrum from ultraviolet down to a few hertz. The sensors may include arrays for sensing visible and/or infrared waves, millimeter wave and microwave radar, and capacitive or electric and/or magnetic field monitoring sensors that rely on the dielectric constant of the object occupying a space but also rely on the time variation of the field, expressed by waves as defined below, to determine a change in state.

A "CCD" will be generally defined to include all devices, including CMOS arrays, APS arrays, focal plane arrays, QWIP arrays or equivalent, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit containing a microprocessor for analysis of the digitized data. In order to minimize the amount of data that needs to be stored, initial processing of the image data takes place as it is being received from the CCD array, as discussed in more detail elsewhere herein. In some cases, some image processing can take place on the chip such as described in the Kage et al. artificial retina article referenced above.

A "sensor" as used herein can be a single receiver or the combination of two transducers (a transmitter and a receiver) or one transducer which can both transmit and receive.

As used herein "Optical flow" or "optic flow" can be the pattern of apparent motion of objects, surfaces, and edges in a visual scene caused by the relative motion between an observer and a scene.

As used herein, a "part" of the vehicle generally includes any component, sensor, system or subsystem of the vehicle such as the steering system, braking system, throttle system, navigation system, airbag system, seatbelt retractor, airbag inflation valve, airbag inflation controller and airbag vent valve, as well as those listed below in the definitions of "component" and "sensor".

As used herein, a "sensor system" generally includes any of the sensors listed below in the definition of "sensor" as well as any type of component or assembly of components which detect, sense or measure something.

Figure 1B:
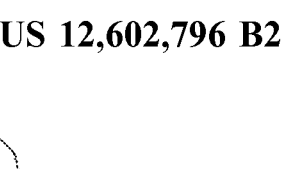
FIG. 1B is a side view of a vehicle showing a passenger cabin comprising the vehicle units and a monitoring system configured to monitor areas and objects inside the vehicle to detect the presence of one or more objects or passengers and optionally determine the type of object and/or the location of the object and/or determine another property or characteristic of the object, in accordance with some embodiments of the present disclosure.

Referring now to the drawings, FIG. 1B is a side view of a vehicle 105 showing a passenger cabin 100 comprising the vehicle 100 units, one or more sensors, such as sensors 112, 114, 116, 118 and a monitoring system 110 configured to monitor areas and objects inside the vehicle 100 to detect the presence of one or more objects (e.g. occupants) such as driver 101 or passenger 102 and optionally determine the type of object and/or the location of the object and/or orientation of the object and/or the posture of the object and/or determine another property or characteristic of the object, in accordance with embodiments. According to one embodiment, the sensors 112, 114, 116, 118 may be one or more of existing vehicle sensors embedded in various locations in the vehicle 100. For example, sensor 112 may be the vehicle's trunk sensor, sensor 114 may be a seat sensor or a seat belt sensor, sensor 116 may be a window or door vehicle sensor, sensor 118 may be a vehicle engine senor. In other embodiments, different and/or additional sensors may be included such as a wave sensor.

According to some embodiments, monitoring system 110 may be installed, and/or mounted, and/or integrated and/or embedded in the vehicle, specifically in vehicle cabin 100 such that the scene is the cabin interior and the object(s) present in the cabin may include, for example, one or more vehicle occupants (e.g. a driver, a passenger, a pet, etc.), one or more objects associated with the cabin (e.g. seta, door, window, headrest, armrest, etc.), an item associated with one or more of the vehicle occupant(s) (e.g. an infant seat, a pet cage, a briefcase, a toy, etc.) and/or the like.

Specifically, the monitoring system 110 is configured to monitor areas and objects which are not in the line-of-sight and/or not in direct line-of-site of the monitoring system 110, for example, hidden areas and objects located at the rear section of the vehicle cabin, such as the rear seats. The hidden objects and areas may include for example a baby seat, such as a rear-facing baby seat 103 placed in the back seats, a passenger leaning on the back seat, a child or a box blocked by the headrest 104 portions of the front passenger seats etc. The monitoring system and methods, in accordance with embodiments, are configured to identify one or more of the properties of the monitored objects. For example, the monitoring system 110 can determine that an object is present on the seat, the type of the object, for example, that the object is a child seat, and/or the pose and orientation of the object for example that the child seat is rear-facing, and/or that the object is a passenger leaning on the back seat. The monitoring system 110 could also identify the object and his status, for example, the type or nature of the object (obtain information as to what the object is), e.g., the object is an adult, that he is drunk or asleep and that he is out of position relative to the airbag an occupied rear-facing child seat, an occupied front-facing child seat, an unoccupied rear facing child seat, an unoccupied front-facing child seat, a child, a dog, a bag of groceries etc.

According to some embodiments, the monitoring system 110 is configured to estimate mass, height, age, and gender of one or more occupants.

According to some embodiments, the systems and methods are configured to generate an output, such as an output signal, to control one or more devices or systems of the vehicle based on the measured and determined data, such as occupancy state. For example, in some cases, the monitoring system 110 is configured to identify a specific person for safety (e.g. anti-theft) as well as for convenience (personalization of the car's system). For example, if the identified occupant is the vehicle's driver the vehicle's audio system interface or display may include control buttons compatible with the driver while if the identified occupant is the vehicle's passenger then the audio system interface or display may include control buttons compatible with the identify the passenger. In some cases, the monitoring system 110 is configured to tune the vehicle's systems according to the detected pose. More specifically, in accordance with embodiments, based on the measured and determined occupancy state of the vehicle (e.g. in real-time) the system 110 is configured to generate an output, such as output signal, for example, to activate one or more of the vehicle's devices/units/subunits. For example, the activated one or more of the vehicle's devices may be an alarm (e.g. audible, visual or other forms) indicating of occupancy with un-buckled seat-belt and/or verifying that each vehicle occupant (e.g. driver, passenger) detected in the vehicle cabin is properly wearing his safety belt; and/or suppress airbags for out of position; and/or control the vehicle's HVAC (Heating, Ventilating, and Air Conditioning) systems; and/or optimize the vehicle's sound system; and/or optimize vehicle's electronic stabilization control (ESC) according to occupants distribution in the vehicle; and/or detect occupant in locked vehicle and accordingly automatically open one or more of the vehicle's windows (for example in case the vehicle's temp is too high or exceeds a predetermined threshold) and/or activate a sound alarm and/or automatically send a message to emergency forces or to the vehicle's owners.

According to some embodiments, the monitoring system 110 may be in communication or may include an infotainment system and/or application configured to adjust one or more multimedia systems according to the count of the vehicle occupants detected in the cabin by the monitoring system 110, specifically according to the location of the vehicle occupant(s) within the cabin, for example, a front seat, a back seat, a right-side seat, a left side seat and/or the like. In another example, the monitoring system 110 may be in communication or may include a vehicle security system and/or application may detect an intruder entering and/or attempting to enter the cabin.

According to some embodiments, the monitoring system 110 may analyze obtained data to verify that the driver is awake and concentrated on driving the vehicle.

According to some embodiments, the monitoring system 110 may include one or more sensors, for example of different types, such as a 2D imaging device and/or a 3D imaging device and/or an RF imaging device and/or a vibration sensor (micro-vibration) and the like to capture sensory data of the vehicle cabin. Specifically, the 2D imaging device may capture images of the vehicle cabin (e.g. 2D images or images captured approximately 390 nm-750 nm and/or wavelengths in the near-infrared (NIR) (e.g., approximately 750 nm-1400 nm) or infrared (e.g., approximately 750 nm-1 mm) portions and/or the near-ultraviolet (NUV)), for example from different angels, and generate visual images of the cabin (e.g. 2D video images). Alternatively or in combination, the 3D imaging device is configured to generate a depth map of the cabin. Alternatively or in combination the monitoring system may detect vibrations (e.g. micro vibrations) of one or more objects in the cabin using one or more vibration sensors and/or analyzing the captured 2D or 3D images to identify vibrations (e.g. micro vibrations) of the objects.

According to one embodiment, the monitoring system 110 may further include an accelerometer.

According to another embodiment, the monitoring system 110 may further include a face detector sensor.

In some cases, the monitoring system 110 may be in communication with one or more of the vehicle existing sensors, such as the sensors 112, 114, 116 and 118, for capturing and receiving additional sensory data in respect to the vehicle system unis status and/or objects in the vehicle. In some cases, the vehicle's sensors may be one or more of the vehicle engine sensors, seat sensors, door sensors, seat-belt sensors, car stability sensors, window sensors and the like. For example, in some cases, the monitoring system 110 may receive one or more signals from the vehicle's Controller Area Network (CAN bus) to identify which seat-belt was clicked and/or which door was opened/closed.

If a passenger has been detected with high probability, then after the seat belt has been locked, it can be assumed that the passenger is in his seat until the seat belt has been opened.

According to one embodiment, the monitoring system sensors and or the vehicle sensors may be in communication with a computing unit comprising one or more processors configured to receive the sensory data captured by the monitoring device sensors and or the vehicle sensors and analyze the data according to one or more of computer vision and machine learning algorithms to detect the presence of one or more objects, such as hidden objects or passengers and determine the type of objects, the location of the objects, the orientation of the object, the status of the object and/or determining another property or characteristic of the objects as will be illustrated hereinbelow.

According to some embodiments, the one or more processors are configured to combine different detection devices and methods for monitoring and detecting the objects. The detection methods and devices may include one or more of: human detection methods and devices; and/or face detection methods and devices; and/or optical flow methods; and/or motion detection methods and devices; and/or tracker methods and devices; and/or volume detection methods and devices and the like. In some cases, the detection methods may be based on data received from one or more sensors such as depth measurement sensors and/or an accelerometer.

For example, in operation information including identified faces of passengers received for example from a face detector may be fused with information including general passenger detection inputs and further with information including detected volume inputs received for example from a volume detector and/or based on inputs received from a depth sensor. The fused information is used to generate a stochastic model (e.g. Markov chain) of one or more predicted occupancy states probabilities used to increase the probability of correct identification of one or more passengers or objects and/or avoid false detections.

In another example, information including identified motion inputs of one or more objects or passengers in the vehicle identified for example by a motion detector and/or an accelerometer may be fused with information as described hereinabove including for example identified faces of passengers, general passengers' body detection and further detected volume of these passengers. The fused information is used in accordance with embodiments, to discriminate between animate objects such as passengers or pets and inanimate objects such as a box or a baby seat.

While passengers and pets may move in their seats or between seats, inanimate objects do not move unless there is a strong acceleration, deceleration or the vehicle is turning sharply. The accelerometer may be used to detect these specific scenarios. In some cases, a depth sensor may be used to distinguish between real (e.g. actual) movements of bodies in the three-dimensional world and the movement of shadows due to illumination changes in a two-dimensional image. Likely, a depth sensor may distinguish between an occupied seat and an empty seat by calculating the distance to the object or seat or the volume inside the seat. A depth sensor may also be used to segment parts of the image and distinguish between passengers in the front seats and passengers in the back seats, for example between the stretched hands of a passenger in the front seat and a passenger in the back seat that may appear at similar positions in a two-dimensional image.

In some cases, the monitoring system is mounted in a dashboard or instrument panel or ceiling of the vehicle.

In some cases, the monitoring system 110 includes a sensing module and a control module (e.g. control board 250). The two modules can reside in the same package or can be separated into two different physical modules. As an example, for a split configuration, the sensing module can reside in the ceiling of the car, while the control module can reside behind the dashboard. The two modules are connected by communication lines and/or may be in communication electrically and/or wirelessly for example through a dedicated connection such a USB connection, wireless connection or any connection known in the art.

In one embodiment, the monitoring system 110 is connected to the vehicle's power. In an alternative embodiment, system 110 comprises a battery, optionally chargeable battery which allows operation even when the vehicle's power is down. Such a design would allow the system to keep operating even if the vehicle power fails during an accident. In a further embodiment, the battery is chargeable from the car's battery or from the car's alternator.

The monitoring system 110 may also be equipped or has an interface to an impact sensor configured to detect an imminent crash. A non-limiting example of such an impact sensor is the impact sensor that exists in cars and is responsible for airbag deployment. In such a configuration, the notification of an impact is being transferred to the system 110 by an electronic signal from the impact sensor. The electronic signal may be transferred directly or by a communication system such as a vehicle's CAN bus interface. In some cases, the impact sensor may be or may be included in CAS as mentioned herein with respect to FIG. 1A.

Alternatively or in combination, the monitoring system 110 is equipped with a built-in impact sensor such as an accelerometer. When an acceleration (or rather a deceleration) above a certain threshold is detected, the system 110 considers the impact signal as being provided, and that a collision will soon occur.

Figure 2A:
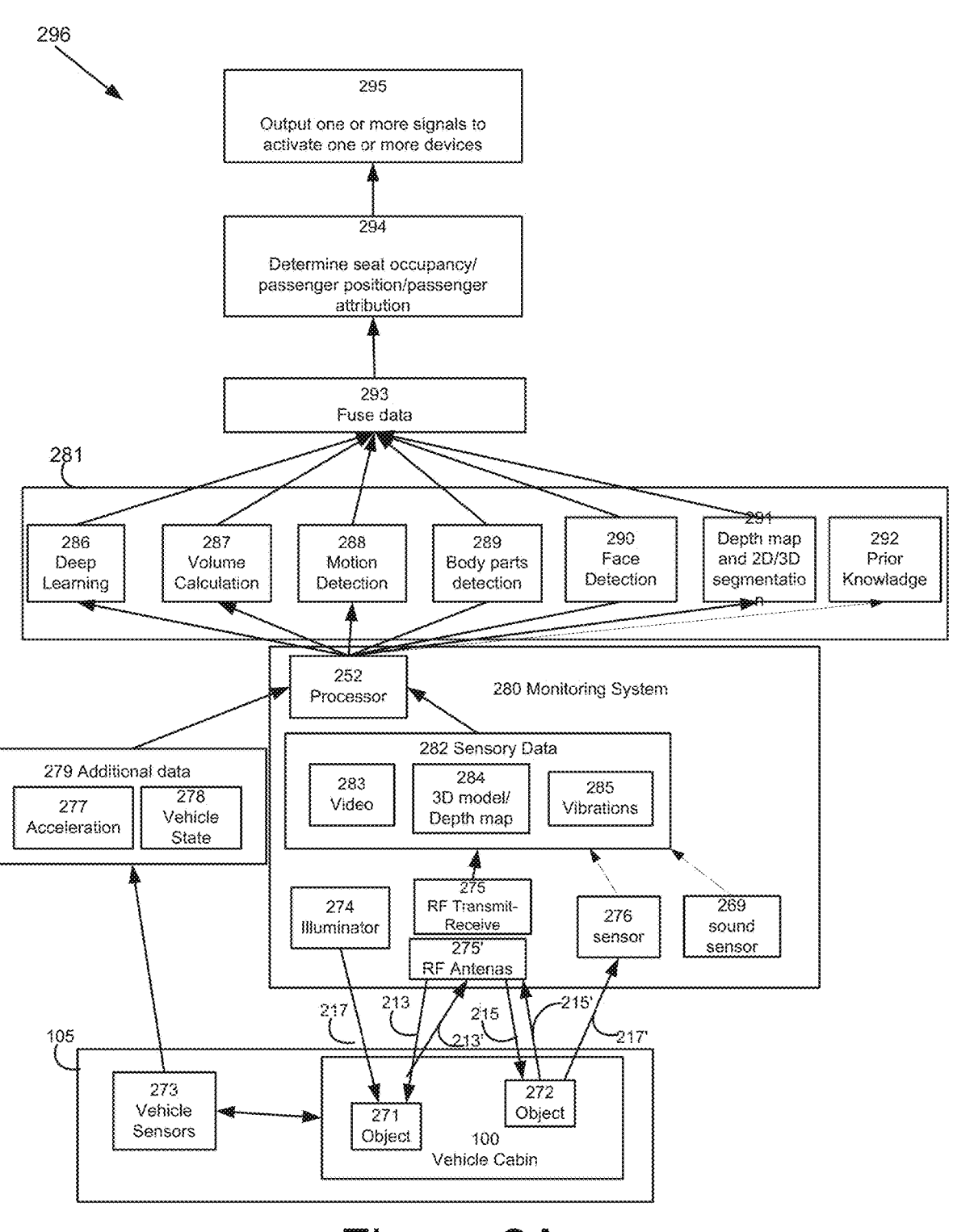
FIG. 2A is a flow diagram illustrating steps of identifying objects, such as hidden objects in a vehicle cabin and providing information on the identified objects, in accordance with some embodiments of the present disclosure.

FIG. 2A is a flow diagram 296 illustrating steps of detecting occupancy state, including identifying objects, such as hidden objects in a vehicle cabin and in some cases providing information on the identified objects, according to one embodiment. As shown in FIG. 2A, a monitoring system 210 includes one or more illuminators such as an illuminator 274 which provides structured light with a specific illumination pattern (e.g., spots or stripes or other patterns), for example, beam 217 to objects 271 and 272 located for example at the rear section in the vehicle cabin 100 and one or more sensors such as sensor 276 which configured and enabled to capture one or more reflected pattern beams such as beam 217', and generate one or more images of the objects 271 and 272 and/or the vehicle cabin 100.

In some cases, illuminator 274 is configured to project a structured light pattern on the scene for example in one or more light spectrums. According to some embodiments, the illuminator 274 may comprise a light source such as a coherent light source, for example, a laser and/or the like configured to emit coherent light such that the structured light pattern is a coherent structured light pattern.

According to some embodiments, the light source may be a single-mode laser source which is configured to project light into the scene in a specific light pattern. For example, the light may be shaped into one or more spots. Accordingly, the depth data such as the distance will be obtained in the reflected spot image, as well as the reflected speckle, as will be explained in detail hereinbelow.

In some cases, the illumination source may include one or more optical elements for generating the pattern such as a pattern of spots. For example, this may be achieved by using one or more optical elements such as a diffractive optical element (DOE) configured to split the single laser spot to multiple spots. Other patterns such as a dot, a line, a shape and/or a combination thereof may be projected on the scene. In some cases, the illumination unit doesn't include a DOE.

In particular, the illumination source may be controlled to produce or emit light in a number of spatial or two-dimensional patterns. Illumination may take the form of any of a large variety of wavelengths or ranges of wavelengths of electromagnetic energy. For instance, illumination may include electromagnetic energy of wavelengths in an optical range or portion of the electromagnetic spectrum including wavelengths in a human-visible range or portion (e.g., approximately 390 nm-750 nm) and/or wavelengths in the near-infrared (NIR) (e.g., approximately 750 nm-1400 nm) or infrared (e.g., approximately 750 nm-1 mm) portions and/or the near-ultraviolet (NUV) (e.g., approximately 400 nm-300 nm) or ultraviolet (e.g., approximately 400 nm-122 nm) portions of the electromagnetic spectrum. The particular wavelengths are exemplary and not meant to be limiting. Other wavelengths of electromagnetic energy may be employed. In some cases, the illumination source 432 wavelength may be any one of 830 nm or 840 nm or 850 nm or 940 nm.

According to one embodiment, the imaging device may be a Continuous Wave Modulation (CWM) ToF imaging device. The ToF imaging device may include a transducer or sensor such as a CMOS or CCD sensors. For example, the sensor may include a two-dimensional array of photo-sensitive or photo-responsive elements, for instance, a two-dimensional array of photodiodes or a two-dimensional array of charge coupled devices (wherein each pixel of the sensor measures the time the light has taken to travel from the illuminator (to the object and back to the focal plane array). According to one embodiment, the ToF sensor may be a VGA 640×480 pixels sensor used with an illumination source generating a beam of a wavelength of 950 nm, modulated at 75 MHz (creating a 2 m range), however other types of illumination sources and sensors in different ranges may be used. Modulation, in accordance with embodiments, may relate to the sin wave oscillation in order to extract the phase of the modulation and hence depth data.

According to some embodiments, the imaging device may include a fisheye lens and special geometry of the installation point. The fisheye lens may be ultra-wide-angle lens that produces strong visual distortion intended to create a wide panoramic or hemispherical image.

According to one embodiment, the monitoring system 210 may include one or more processors such as processor 252. The processor 252 may be in wired or wireless communication with other internal or external devices and/or other internal or external processors. For example, output from processor 252 may trigger a process within the processor 252 or may be transmitted to another processor or device to activate a process at the other processor or device.

According to another embodiment, the processor 252 may be external to the monitoring system 210 and may be embedded in the vehicle or may be part of the vehicle's processing unit or computing unit.

Alternatively or in combination, the monitoring system 210 may include an RF (Radio Frequency) transmit-receive unit 275 including, for example, an RF transmit-receive unit 275, for example, an RF transceiver configured to generate and direct RF beams, such as RF beams 213 and 215 towards the objects 271 and 272 using RF antennas 275' and receive the reflected RF beams 213' and 215' to provide an RF image of the vehicle cabin 100 and/or objects 271 and 272. The captured images, including for example the RF signals and reflected pattern images are provided to the processor 252 to generate a depth map representation 291 and 2D/3D segmentation of the vehicle cabin 100 and/or the objects 271 and 272.

In one embodiment, the processor 252 may instruct the illuminator 265 and/or the RF transmit-receive unit 275 to illuminate specific areas in the vehicle cabin.

According to one embodiment, the monitoring system may include a sound sensor 269 such as one or more ultrasound sensors and/or a directional microphone configured and enabled to detect the presence of a person and/or vitality signs to locate for example the mouth of a person which is speaking and generate data inputs to detect one or more objects location in the vehicle. According to some embodiments, the processor 252 may further receive and/or generate additional data 279 including for example info on the vehicle state 278, speed and acceleration 277 as captured by vehicle sensors 273. The sensory data 282 and the additional data 279 are analyzed by the processor 252.

According to some embodiments, information including the sensory data 282 and the additional data 279 are analyzed using a multitude of computer vision and machine learning algorithms. These may include but are not limited to Neural Networks such as one or more Convolutional Neural Networks for detecting people, networks that specifically detect the face, hands, torso and other body parts, networks that can segment the image and specifically the passengers in the image based on the 2D and 3D images, algorithms that can calculate the volume of objects and people and algorithms that can determine if there is motion in a certain region of the car.

The analysis output 281 includes multiple types of data on the objects (e.g. objects 271 and 272) and the vehicle cabin, such as information on occupants and/or inanimate objects such as a box or bag of groceries or an empty child seat. Specifically, in some cases the data 281 may include: data related to detected body parts of objects 289 and/or data related to motion of objects 288 and/or data related to the volume of objects 287 and/or data related to occupancy state in the vehicle cabin based on deep learning 286.

According to some embodiments, the multiple types of data may include depth data 290 including one or more depth images, obtained for example by the sensor 276. The depth data may be specifically used to detect body parts of the passengers and segment the body or body parts in the image. In some cases, the depth data may also be used to determine the pose of a person, such as sitting up-right, leaning to the side or leaning sideways.

According to some embodiments, the multiple types of data may include prior knowledge of data 292.

Nonlimiting examples of prior knowledge data may include: information on the vehicle units such as doors/ window/seatbelt (e.g. seatbelt state) and/or prior information on objects (e.g. driver or passengers) in the vehicle; and/or rules or assumptions such as physical assumptions relating to the objects in the vehicle and/or to the vehicle's units, for example, seat transition rules relating to likelihood of movements inside the vehicle, e.g. to rule out unlikely changes in the occupancy prediction or alternatively confirm expected changes in the vehicle occupancy state. Specific examples of the physical assumptions may include high probability that the driver seat is occupied in a driving vehicle (nonautonomous vehicle) and/or low probability that a passenger may move to one of the rear seat in a predetermined short time, or from one seat to another seat in a single frame.

In the following step 293, the multiple types of data are fused to determine at step 294 output data including for example one or more of the number of seat occupancy and/or information on objects (e.g. driver or passengers) such as objects 271 and 272. The detected output information on the objects may include one or more of the position, orientation and attribution (e.g. whether a passenger is sitting straight, leaning to the side or forward). For example, the information may include identifying one or more passengers, such as a complete body or body portion such as a face or hand, for example at hidden sections in the vehicle such as the rear section of the vehicle.

According to one embodiment, the multiple types of data are fused by a fusion algorithm which outputs the best decision considering the reliability of one or more or each data input (e.g. motion of objects 288 and/or volume of objects 287 and/or occupancy state based on deep learning 286 face detection 290 prior knowledge 292).

Specifically, the fusing algorithm includes analyzing the fused data to yield a prediction model such as a stochastic prediction model (e.g. Markov chain, for example in the form of a Markov matrix) of one or more predicted occupancy states probabilities. The prediction model is used to continuously update over time the probability of one or more current occupancy state (e.g. probability vector) to yield an updated occupancy state, e.g. determine in real-time a location of objects 271 and 272 and/or the number of objects in the vehicle cabin. In some cases, the predicted state and the current state are combined by weighting their uncertainties using, for example, Linear Time-Invariant (LTI) methods such as Infinite Impulse Response (IIR) filters. Once the body or body parts are detected, the objects are tracked at step 294. For example, the objects may be tracked in the 2D image or the depth image using conventional trackers such as correlation trackers and edge trackers. In some cases, the fusing data may be or may include the prediction model. A detailed description of the fusing algorithm is described hereinbelow with respect to FIGS. 6A, 6B and 6C.

According to one embodiment, based on determined occupancy state the processor 252 may output at step 295 data or signals which may be used to provide information and/or for controlling devices, units or applications in the vehicle, which may be remote or integral to the vehicle, for example, an electronic device such as an alarm, alert or a lighting may alert on out-of-position and accordingly activate an occupant protection apparatus (e.g. airbag), the vehicle's entertainment may be configured according to the identified passenger or driver which was identified by the monitor system as the one who activates the device, and/or other devices. The related device or unit may be controlled, such as activated or modulated, by the signal output according to embodiments.

In some cases, the output signals may include seat belt reminder (SBR), out of position indication (OOP) for example for airbags suppression and driver monitoring system (DMS) for driver's alert. Other types of data and/or signals provided by the system or the processor 252 are described with reference to FIG. 1B.

Alternatively or in combination, once the objects are identified using one or more of the neural networks, then the neural network is trained to output a number of points such as a predefined number of points corresponding to certain body parts or a skeleton of lines. At the following step, these points and lines can be tracked in time using conventional tracking algorithms such as Kalman filters. It is stressed that the location of these points may be estimated by the tracker even if the tracking is lost, for example when the full body or parts of the body are obstructed, i.e. by the front seats.

According to some embodiments, the body parts of the passengers may be detected using computer vision algorithms and/or neural networks that are trained to detect persons such as human contour, for example, a complete human body and/or specific human body parts. Specifically, the face of a person may be detected by well-known detection or recognition methods. Non-limiting examples of such methods include a Viola-Jones algorithm or SSD neural networks. Body parts may be detected by a neural network that is specifically trained to detect the body pose. Non-limiting examples of such methods include OpenPose or OpenPose Plus methods.

Figure 2B:
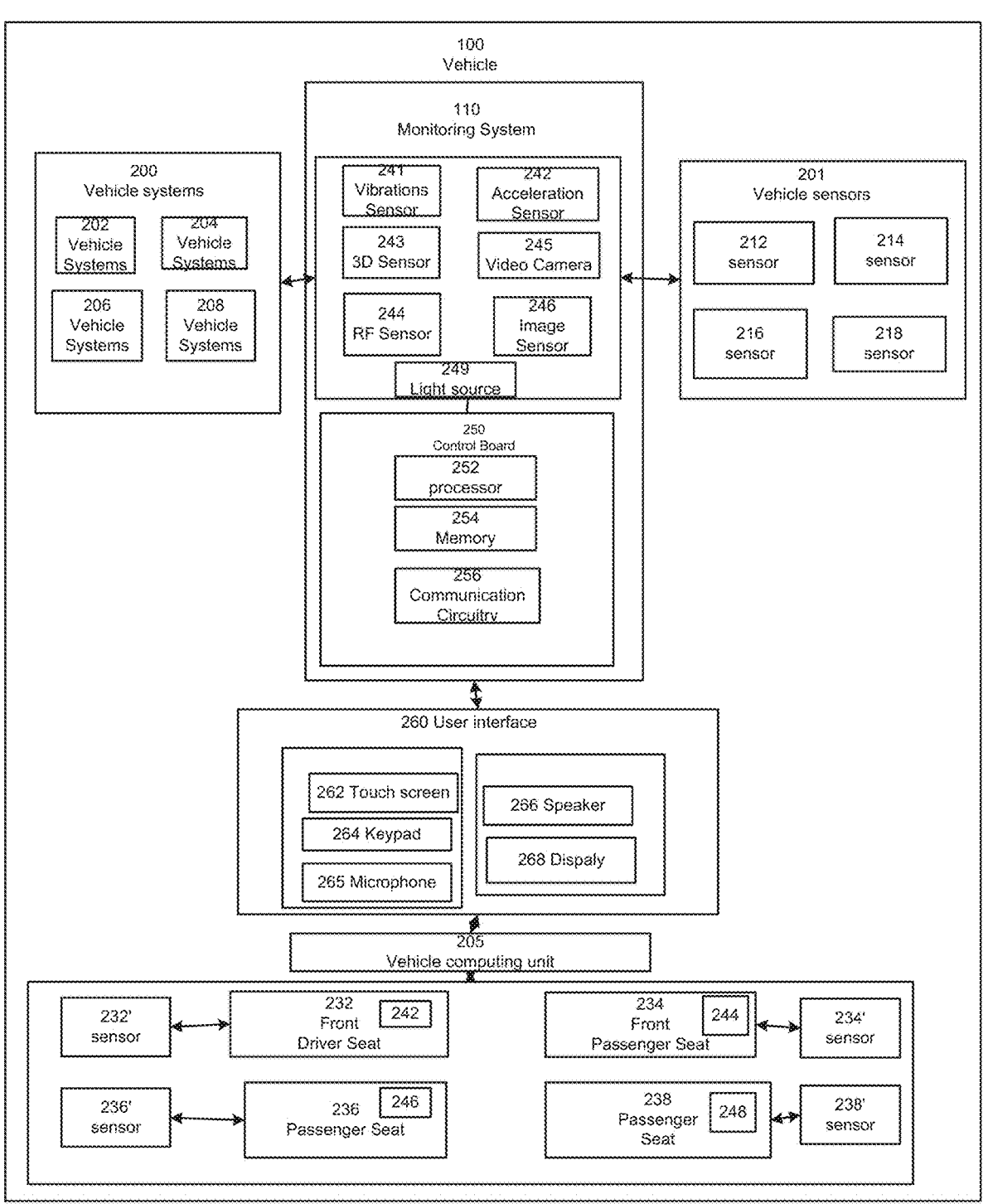
FIG. 2B illustrates a more detailed block diagram of the vehicle comprising the monitoring system, in accordance with some embodiments of the present disclosure.

FIG. 2B illustrates a more detailed block diagram of the vehicle cabin 100. Notably, the vehicle cabin 100 can include more or fewer components than those shown in FIG. 2B. For example, the vehicle cabin 100 can include a wired or a wireless system interface, such as a USB interface or Wi-Fi, interfaces to connect the monitoring system 110 and the vehicle's computing unit 205 with one or more of the vehicle systems 200 such as vehicle systems 202-208, vehicle sensors 201 such as vehicle sensors 212-218 seat locations 232-238 and respective seat sensors 232'-238'. The hardware architecture of FIG. 2B represents one embodiment of a representative vehicle comprising a monitoring system 110 configured to monitor and identify automatically objects and areas in the vehicle, such as hidden objects. In this regard, the vehicle of FIG. 2B also implements a method for monitoring objects and/or passenger to identify the attributes of the objects and/or passengers also in cases where due to momentary poor visibility or false detection they may not be identified. The identification may be based on various types of information received, for example in real-time, from various types of sensors in the vehicle such as dedicated sensors embedded in the monitoring system 110 and existing vehicle sensors embedded in various locations in the vehicle 100. Exemplary embodiments of said method will be described below in relation to FIGS. 3-5.

As shown in FIG. 2B, the vehicle cabin 100 includes a vehicle computing unit 205 which controls the vehicle's systems and sensors and a monitoring system 110 including a control board 250, which controls the monitoring system 110 and which may be in communication with the vehicles units and systems such as the vehicle computing unit 205 and the vehicle systems 200. In some cases, the control board 250 of the monitoring system 110 may be included in the computing unit 205. Vehicle 100 also comprises passenger seat position 232-238 including a driver's seat position 232, a front passenger seat position 234, and left and right rear passenger seat positions 236 and 238. Although four seat positions are shown in FIG. 2B for illustrative purposes, the present invention is not so limited and may accommodate any number of seats in any arrangement within the vehicle. In one implementation, each passenger seat position has automatically adjustable settings for seat comfort, including but not limited to, seat height adjustment, fore and aft adjustment position, seatback angle adjustment. Each passenger seat position may also include respectively and separately configurable one or more sensors 232'-238' for controlling the passenger's seats and windows and environmental controls for heating, cooling, vent direction, and audio/video consoles as appropriate. In some cases, the passengers may have communication devices 242-248, one for each passenger position, indicating that each passenger in vehicle 100 is carrying a communication device. Although the exemplary embodiment illustrated in FIG. 2B shows each passenger carrying a communication device, various implementations envision that not all passengers need to carry a device. Indeed it is not required that any communication devices be present in the vehicle at all.

According to one embodiment, the monitoring system 110 may include a plurality of sensors of different modalities. For example, the monitoring system 110 may include a vibrations sensor 241, and/or an acceleration sensor 242, and/or 3D sensor 243, and/or an RF sensor 244, and/or a video camera 245, such as a 2D camera and/or other types of sensors such as Ultrasonic sensor, acoustic sensor (e.g. microphone), pressure sensor, thermal detector and the like.

In some cases, the monitoring system 110 may include an image sensor 246 for mapping a speckle field generated by each spot formed on the vehicle surface and a light source 249, such as a coherent light source adapted to project a structured light pattern, for example, a multi-beam pattern on the vehicle cabin. In accordance with embodiments a processor, such as processor 252 is configured to process speckle field information received by the image sensor and derive surface vibration information to identify one or more objects in the cabin, including for example motion and micro-vibrations of one or more of the detected objects.

The projected structured light pattern may be constructed of a plurality of diffused light elements, for example, a spot, a line, a shape and/or a combination thereof may be reflected by one or more objects present in the scene and captured by the image sensor 246 integrated in the monitoring system 110.

According to some embodiments, the control unit 250 may be connected to one or more of the vehicle systems 202-208, the vehicle's sensors 110, the monitoring system sensors, the seat 232-238 and/or the seat's sensors' 232'-238' via one or more wired connections. Alternatively, control unit 250 may be connected to the vehicle systems 202-208, the vehicle's sensors 110, the monitoring system sensors, the seat 232-238 and/or the seat's sensors' 232'-238' through a wireless interface via wireless connection unit 252. Wireless connection 252 may be any wireless connection, including but not limited to, Wi-Fi (IEEE 802.11x), Bluetooth or other known wireless protocols and/or.

In accordance with embodiments, the computing unit 205 is also preferably controllably connected to the vehicle systems 202-208, the vehicle's sensors 110, the monitoring system sensors, the seat 232-238 and/or the seat's sensors' 232'-238'. Vehicle systems 222-228 may be connected through a wired connection, as shown in FIG. 2, or by other means.

The vehicle systems may include, but are not limited to, engine tuning systems, engine limiting systems, vehicle lights, air-condition, multimedia, GPS/navigation systems, and the like.

The control board 250 may comprise one or more of a processor 252, memory 254 and communication circuitry 256. Components of the control board 250 can be configured to transmit, store, and/or analyze the captured sensory data, as described in further detail herein.

The control board 250 may also be connected to a user interface 260. The user interface 260 may include input devices 261, output devices 263, and software routines configured to allow a user to interact with control board 250. Such input and output devices respectively include, but are not limited to, a display 268, a speaker 266, a keypad 264, a directional pad, a directional knob, a microphone 265, a touch screen 262, and the like.

The microphone 265 facilitates the capturing of sound (e.g. voice commands) and converting the captured sound into electrical signals. In some cases, the electrical signals may be used by an onboard computer interface with various applications.

The processor 252 may comprise a tangible medium comprising instructions of a computer program, for example, the processor may comprise a digital signal processing unit, which can be configured to analyze and fuse data such as sensory data received from the various sensors using multiple types of detection methods. In some cases, the processed data output can then be transmitted to the communication circuitry 256, which may comprise a data encryption/transmission component such as Bluetooth™. Once encrypted, the data output can be transmitted via for example Bluetooth to the vehicle computing unit and/or the vehicle user interface and may be further presented to the driver on the vehicle. Alternatively or in combination, the output data may be transmitted to the monitoring unit interface.

FIG. 3 is a high-level schematic flowchart of method 300 for monitoring areas or objects in a vehicle, according to some embodiments. For example, the method may include determining occupancy in the vehicle cabin, for example in real-time, and specifically identifying the presence of one or more objects, type of objects (e.g. objects of interest—adult, baby, baby seat, box) number of occupants in a scene, pose, orientation etc. More specifically the method may further identify that the object is a baby and that the baby is awake and/or that the baby safety belt is released. Some stages of method 300 may be carried out at least partially by at least one computer processor, e.g., by processor 252 and/or vehicle computing unit 205. Respective computer program products may be provided, which comprise a computer-readable storage medium having a computer-readable program embodied therewith and configured to carry out of the relevant stages of method 300. In other embodiments, the method includes different or additional steps than those described in conjunction with FIG. 3. Additionally, in various embodiments, steps of the method may be performed in different orders than the order described in conjunction with FIG. 3.

At step 310 data, such as sensory data including, for example, multiple images of the vehicle cabin captured respectively by multiple different sensing devices are received for example at the processor 252 and/or the vehicle computing unit 205. In some cases, the multiple images may be captured by one or more sensors included for example in a monitoring system such as the monitoring system 110 illustrated in FIGS. 1B, 2A and 2B. The one or more sensors may be one or more of a 2D imaging device and/or a 3D imaging device and/or an RF imager and/or a vibration sensor (micro-vibration) and the like.

In some cases, the data may include identified vibrations of one or more objects in the vehicle.

In some cases, the data may include identified micro-vibrations extracted from the captured multiple images using, for example, speckle pattern detection algorithms. Further details on the speckle pattern analysis for detecting the micro-vibrations may be found in International Application No. PCT/IL2015/051255 (Publication WO2016/103271) entitled "System and Method for Detecting Surface Vibrations" filed Dec. 27, 2015, and International Application No. PCT/IL2019/051317 entitled "SYSTEMS, DEVICES AND METHODS FOR MICRO-VIBRATION DATA EXTRACTION USING A TIME OF FLIGHT (ToF) IMAGING DEVICE" International filing date, Dec. 1, 2019 and International Application No. PCT/IL2019/051422 entitled "SYSTEMS, DEVICES AND METHODS FOR VEHICLE POST-CRASH SUPPOR" International filing date, Dec. 28, 2019, the contents of which are incorporated herein by reference in their entirety.

At step 320 additional data including information such as prior knowledge and/or information relating to the vehicle state and/or condition is received, for example from the vehicle's sensors or units, or from other devices or units. In some cases, the additional data may be received at the processor 252 and/or the vehicle computing unit 205, in accordance with embodiments. The additional data may include the vehicle's speed, acceleration, gear position, fuel and/or vehicle units status including for example information whether the vehicle doors and windows are open/closed and/or which door or window is closed or open, and/or information relating to the vehicle seats or related seat units such as seat belt status, air condition and vehicle interior temperature, multimedia and the like. This information may be obtained, for example directly by the vehicle sensors, such as the vehicle doors sensors, windows sensors, seat sensors, engine, and multimedia. In some cases, the information may be obtained via the vehicle computing unit or via external devices.

At step 330 the obtained data including the sensory data and the additional data relating to the vehicle's state and/or condition are analyzed for example by the processor 252 to extract detailed information on one or more objects and/or interior passengers compartment. According to some embodiments, the extracted information may include occupancy state and/or details on the one or more objects of interest and/or portions of the objects and/or areas in the vehicle. For example, the analysis may include identifying one or more body parts of passengers in the vehicle cabin such as the face, hands, torso and/or other body parts of the passengers.

In some cases, the analysis is performed using one or more of computer vision and machine learning algorithms. These may include but are not limited to Neural Network such as Convolutional Neural Network detection algorithms configured to detect objects such as one or more persons in the vehicle cabin.

Alternatively or in combination the computer vision and machine learning algorithms may include Neural Network detection algorithms configured to specifically detect the face, hands, torso and other body parts of the vehicle passengers.

Alternatively or in combination, the computer vision and machine learning algorithms may include Neural Network detection algorithms configured to segment the multiple images of the vehicle cabin and specifically the passengers in the multiple images based on for example the 2D and 3D images. For example, computer vision and machine learning algorithms may include comparing 3D data to an empty car 3D data. In some cases, the segmentation can be obtained by a segmentation algorithm such as a semantic segmentation neural network. Alternatively or in combination, the computer vision and machine learning algorithms may include using a neural network training to segment objects such as occupants.

Alternatively or in combination the computer vision and machine learning algorithms may include Neural Network detection algorithms configured to calculate the volume of the detected objects.

Alternatively or in combination the computer vision and machine learning algorithms may include Non Neural Network detection algorithms such as classical computer vision algorithms which are configured to analyze data and determine if there is a motion of one or more objects in specific regions in the vehicle using, for example, optical flow methods. Such an analysis may be based on for example optical flow algorithms such as Lucas Kanade algorithm or block matching algorithm such as algorithms utilized for motion estimation in video compression algorithms (e.g. MPEG).

At step 340 the output of the analyzed data including for example the identified portions of the objects and/or areas in the vehicle, and/or identified motion, and/or image segmentation, and/or measured volume of objects in the vehicle and additional data analyzed info based on for example the face detector, and/or body pose model, and/or accelerometer signal and/or signals from the vehicle such as doors and seat belts status are fused to yield best (e.g. most likely) decision considering the reliability of the obtained information. The best decision may be defined, in accordance with embodiments, as the decision with the highest probability and/or a decision with the least cost in terms of optimizing between the object (e.g. occupant) detection rate and the false positive rate.

According to some embodiments, the fusing process includes using fusing algorithms to combine two or more types of data inputs such as face detection data, optical flow data and/or prior knowledge.

In accordance with embodiments, the obtained various data inputs are fused by the fusing algorithm to determine the probability of the occupancy of for example a certain seat by a passenger. For example, if a face of an occupant is detected with a high probability at a certain seat and that seat's seat belt is clicked, then the algorithm can deduce with a very high confidence level that there is a passenger in that seat. Moreover, the fusing algorithm's state machine can remember that there is a passenger in that seat even if the passenger is not detected in future frames, due for example of a poor or limited field of view, as long as the seat belt was not opened.

It is stressed that various fusing combinations including different combinations of data fusing may be used in accordance with embodiments. A detailed description of a fusing algorithm is described hereinbelow with respect to FIGS. 6A, 6B and 6C.

At step 350 the one or more outputs of the fusing process are provided. This step may include for example outputting an estimation of the probability that one or more seats in the vehicle are occupied and/or the total number of passengers in the vehicle and/or the position of the identified passengers, for example, whether a passenger is sitting straight or leaning to the side or forward.

At step 360 one or more signals may be output and/or transmitted to activate one or more devices or systems, such as the vehicle's device/units/applications based on the identified objects.

In accordance with embodiments, the systems and methods for monitoring hidden objects and areas in a vehicle may include tracking the number of passengers in the vehicle based on inputs received from the monitoring device and/or one or more of the vehicle's sensors. Additionally, the systems and methods include tracking the movements of the detected passengers (e.g. from the moment they entered the vehicle) and based on the identified number of passengers and their movements as received from the vehicle's one or more sensors to determine the position of the passengers, e.g. passenger leaning forward, passenger lying on the back seat.

Specifically, according to some embodiments, the fusion may output one or more of the following identifications: (i) the determination of the number of objects (e.g. passengers) in the vehicle, (ii) the determination of the location of the objects (e.g. passengers) (iii) the determination of the position and/or orientation of the object. Specifically, for example, a) the determination of the presence and position of objects in the rear seat(s), b) the determination of the presence, position and orientation of child seats in the rear seat, (iii) the monitoring of the rear of an occupant's head, (iv) the monitoring of the position of occupant, (v) the monitoring of the position of the occupant's knees, (vi) the monitoring of the occupant's position relative to the airbag, (vii) the measurement of the occupant's height, as well as other monitoring functions as described elsewhere herein, (viii) monitor occupants weight, (ix) monitor body pose and specifically out of normal sitting pose, (x) monitor body parts out of window (xi) monitor head direction of the occupants, (xii) monitor gaze direction of the one or more occupants.

Figure 4:
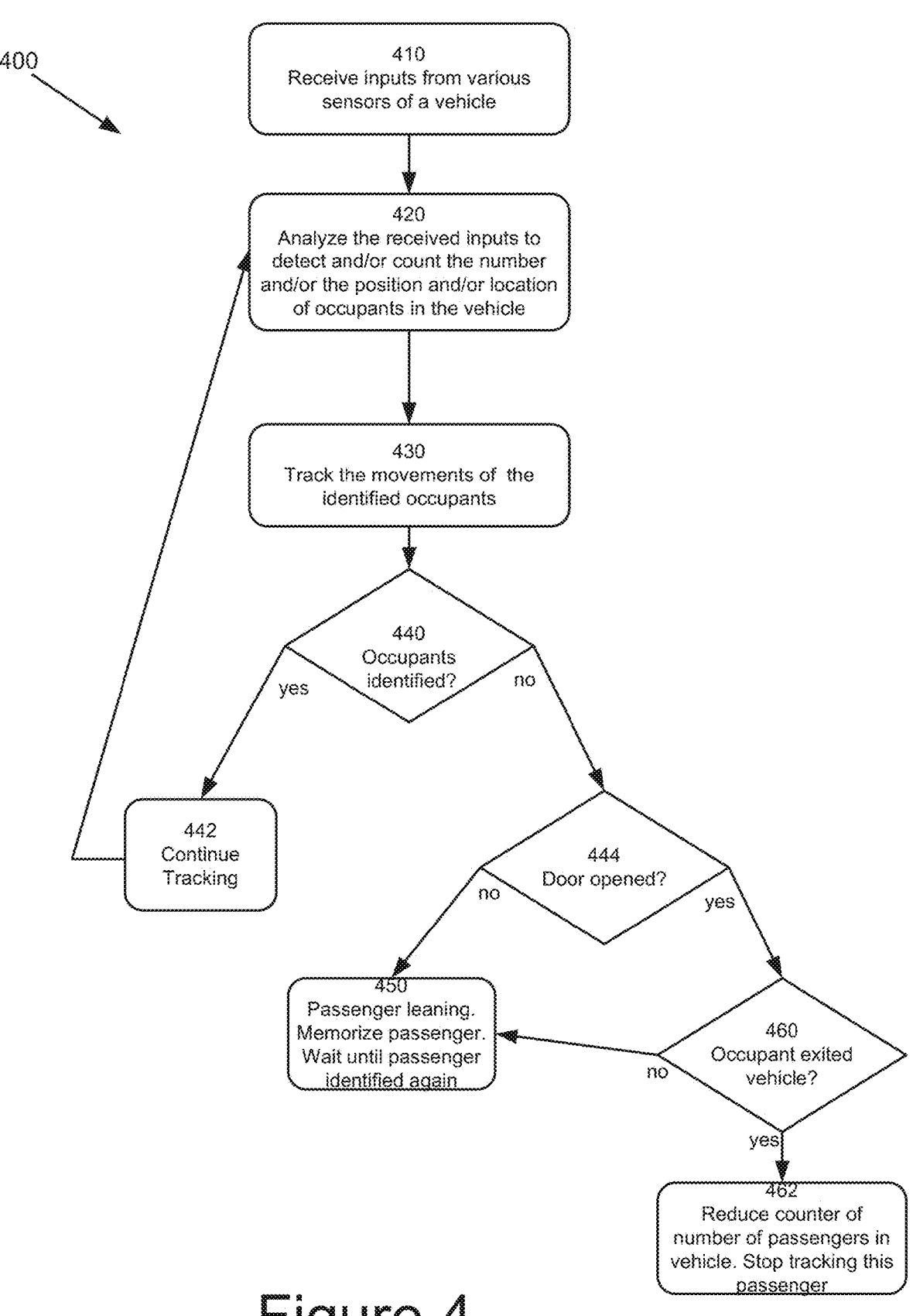
FIG. 4 shows a flowchart of a method for monitoring the interior of a passenger compartment in a vehicle and more specifically for identifying the location and/or position and/or number of passengers in the vehicle in cases where the passengers may not be identified for short or prolonged time periods, in accordance with some embodiments of the present disclosure.

FIG. 4 shows a flowchart 400 of a method for monitoring the interior of a passenger compartment in a vehicle and more specifically for identifying the location and/or position and/or orientation and/or number of passengers in the vehicle in cases where the passengers may not be identified for short or prolonged time periods due to interior vehicle visibility limitations such blocking obstacles (e.g. front seat) or passenger movement, in accordance with embodiments. In other embodiments, the method includes different or additional steps than those described in conjunction with FIG. 4. Additionally, in various embodiments, steps of the method may be performed in different orders than the order described in conjunction with FIG. 4.

At step 410 one or more inputs (e.g. sensory data) are received from various sensors such as sensors embedded in the vehicle and/or from sensors of a monitoring system such as the monitoring system 110, for example at the processing unit of the monitoring system 110. The inputs may include information comprising, for example, sensory data obtained by the vehicle's sensors. Specifically, the inputs may include 2D or 3D images of the vehicle cabin, for example from different angels, captured by one or more 2D and 3D imaging devices.

In some cases, the inputs may also include data relating to the vehicle and/or vehicle units state and/or condition, such as vehicle speed, acceleration, gear position, air condition and vehicle interior temperature and the like. In some cases, the inputs may include whether the vehicle doors and windows are open/closed and/or when they were opened and/or closed and/or the number of times they were closed or opened and which door or window is or was closed or opened. In some cases, the inputs may include information relating to the vehicle seats or the seat units such as seat belt status. This information may be obtained, for example directly by the vehicle sensors, such as the vehicle doors sensors, windows sensors, seat sensors, engine, and multimedia. In some cases, the information may be obtained via the vehicle computing unit. In some cases, the data may include identified vibrations of one or more objects in the vehicle. In some cases, the data may include identified micro-vibrations extracted from the captured multiple images using, for example, speckle pattern detection algorithms.

At step 420 the obtained information including various types of data is analyzed, for example by the processing unit, to detect and/or count the number and/or the position and/or location of passengers in the vehicle. For example, the analysis may include detecting and counting (e.g. in real-time) the number of passengers in the vehicle. According to some embodiments, the analysis may include processing one or more images, such as 2D and/or 3D and/or RF images using known image detection or recognition algorithms, to identify passengers in the vehicle. The identification output may include for example movements and/or structure of the identified passengers. The extracted detection results may be further fused with additional information obtained for example from the vehicle sensors, using fusion algorithms to yield an accurate number and/or position of objects (e.g. passengers) in the vehicle, for example in real-time.

The additional information may include for example inputs received from the Vehicle's sensors including information such as which and/or when one or more of the vehicle systems or units were used.

According to one embodiment, the multiple types of data are fused by a fusion algorithm which outputs the best decision considering the reliability of each data input. Specifically, the fusing algorithm includes analyzing the fused data to yield a stochastic prediction model (e.g. Markov chain, for example in the form of a Markov matrix) of one or more predicted occupancy states probabilities. The prediction model is used to continuously update over time the probability of one or more current occupancy state (e.g. probability vector) to yield an updated occupancy state, e.g. determine in real time the location of objects and/or the number of objects in the vehicle cabin. In some cases, the predicted state and the current state are combined by weighting their uncertainties using for example Linear time-invariant (LTI) methods such as Infinite impulse response (IIR) filters. Once the body or body parts are detected, the objects are tracked. For example, the objects may be tracked in the 2D image or the depth image using conventional trackers such as correlation trackers and edge trackers. A detailed description of the fusing algorithm is described hereinbelow with respect to FIGS. 6A, 6B and 6C.

At step 430 the movements of passengers in the vehicle are tracked, for example from the moment they entered the vehicle. In some cases, the movement tracking process includes receiving, for example continuously and/or in real-time, various indications from the vehicle sensors and/or the vehicle units info on the vehicles' units status, e.g. vehicle windows, doors, air condition, multimedia activation, etc. Accordingly, based on the various indications (e.g. the number of passengers, and vehicle's doors/windows/multimedia/air-condition status) the position and/or orientation and/or location (e.g. which of the vehicle's seats are occupied) and/or number of passengers in the vehicle sitting locations and/or sitting positions, particularly in cases where one or more passenger in the vehicle may momentarily not be detected. For example, the method may identify that a passenger in the back seat is leaning forward and is obstructed by the front seat.

Specifically, according to one embodiment, if a number of passengers were identified with high reliability and the doors were opened and if at the tracking process the method and system determines that a certain passenger's body moved forward and downwards, then the system may decide that the passenger is leaning forward as will be explained herein in details.

At step 440 a binary decision can be made whether occupant(s) were identified and/or the number of identified passengers in the vehicle. If an occupant is identified then at step 442 the monitoring method proceeds and tracks the number of occupants in the vehicle as illustrated for example at step 420. If one or more of the passengers are not identified, for example, due to a passenger movement and/or as a result of obstruction by the front seat then at step 444 a binary decision can be made regarding the vehicle's doors or other units or devices of the vehicle. If an identification that none of the vehicle's doors were opened then at step 450 an identification that one of the occupants changed his position (e.g. leaning and/or bending) is provided. In some cases, the method may include memorizing the "missing occupants" (e.g. the leaning passenger). Optionally or in combination the method may continuously track hidden areas at the vehicle to identify the location and position of the one or more "missing passengers" until they are identified for example by one of the monitoring systems or vehicle sensors. If an identification that one or more of the vehicle doors was opened then at step 460 a binary decision can be made regarding the updated passengers' number in the vehicle and optionally their current position and/or location. If one or more of the vehicle passengers left the vehicle then at step 462 a passenger counter is subtracted by one and optionally the monitoring system stop tracking the identified passenger. If it is identified that none of the passengers left the vehicle then the process proceeds to step 450 and an identification that one of the passengers changed his position (e.g. leaning and/or bending) is provided.

Figure 6A:
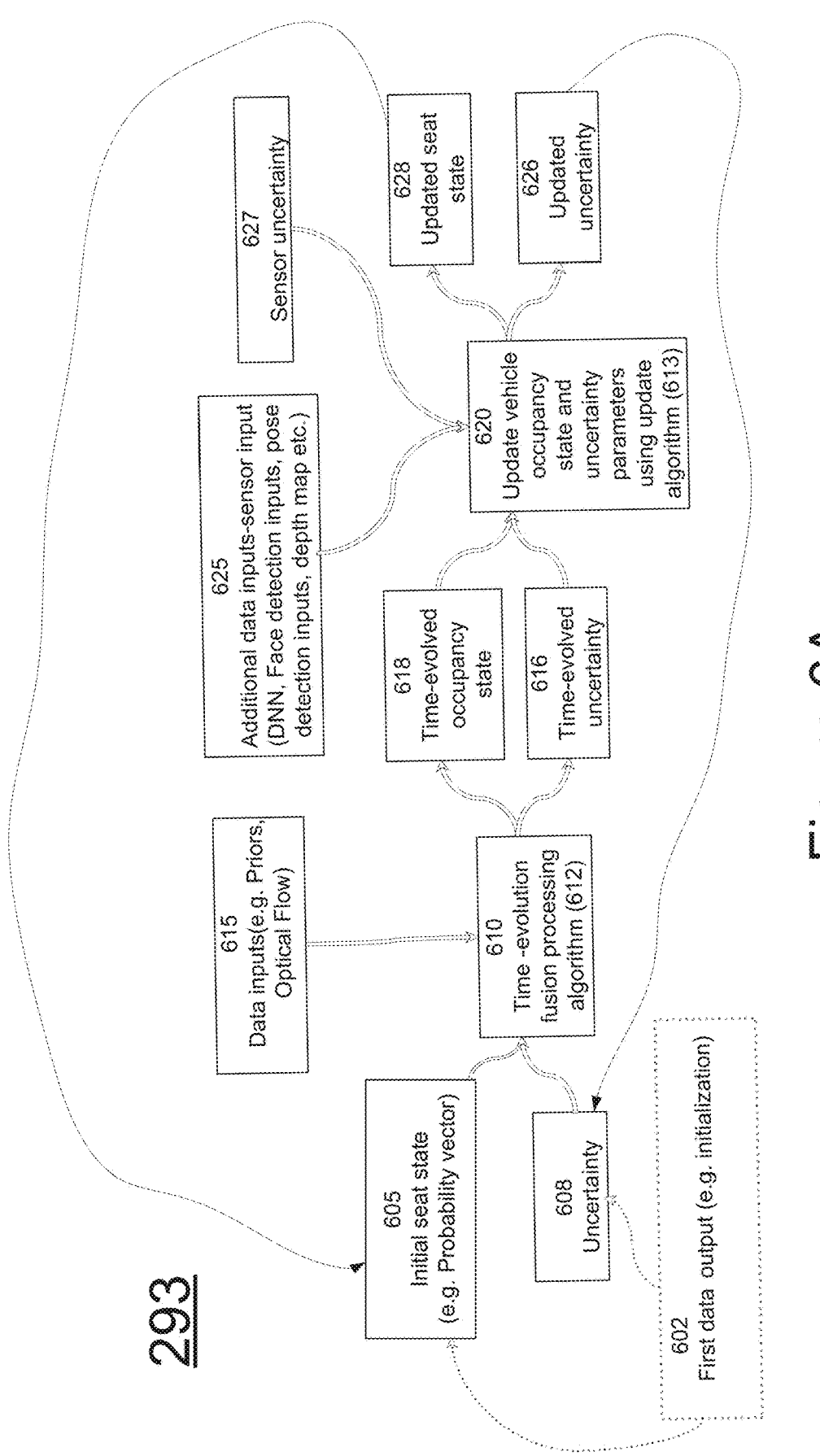
FIG. 6A illustrates a flowchart of a fusing method, in accordance with some embodiments of the present disclosure.

FIG. 6A illustrates a flowchart of the fusing method 293 of FIG. 2A which is configured and enabled to receive and combine input data from multiple sources into a coherent and stable prediction module to provide information such as an accurate vehicle occupancy information including for example number of seat occupancy in a vehicle, in accordance with embodiments. The monitoring Systems 110 or 510 or one or more processors such as processor 252, for example, may be used to implement method 293. However, method 293 may also be implemented by systems or methods or processors having other configurations, such as a system comprising a single sensor.

At step 605 initial data for example in the form of a probability vector including, for example, the probability of all possible seated or occupancy states relating to a vehicle occupancy current state is provided.

Specifically, the positions (e.g. indices) of the probability vector represent the possible outcomes of a discrete random variable, where '1' represents a seat occupancy and '0' represents an unoccupied seat and the vector provides the probability mass function of that random variable.

Figure 6B:
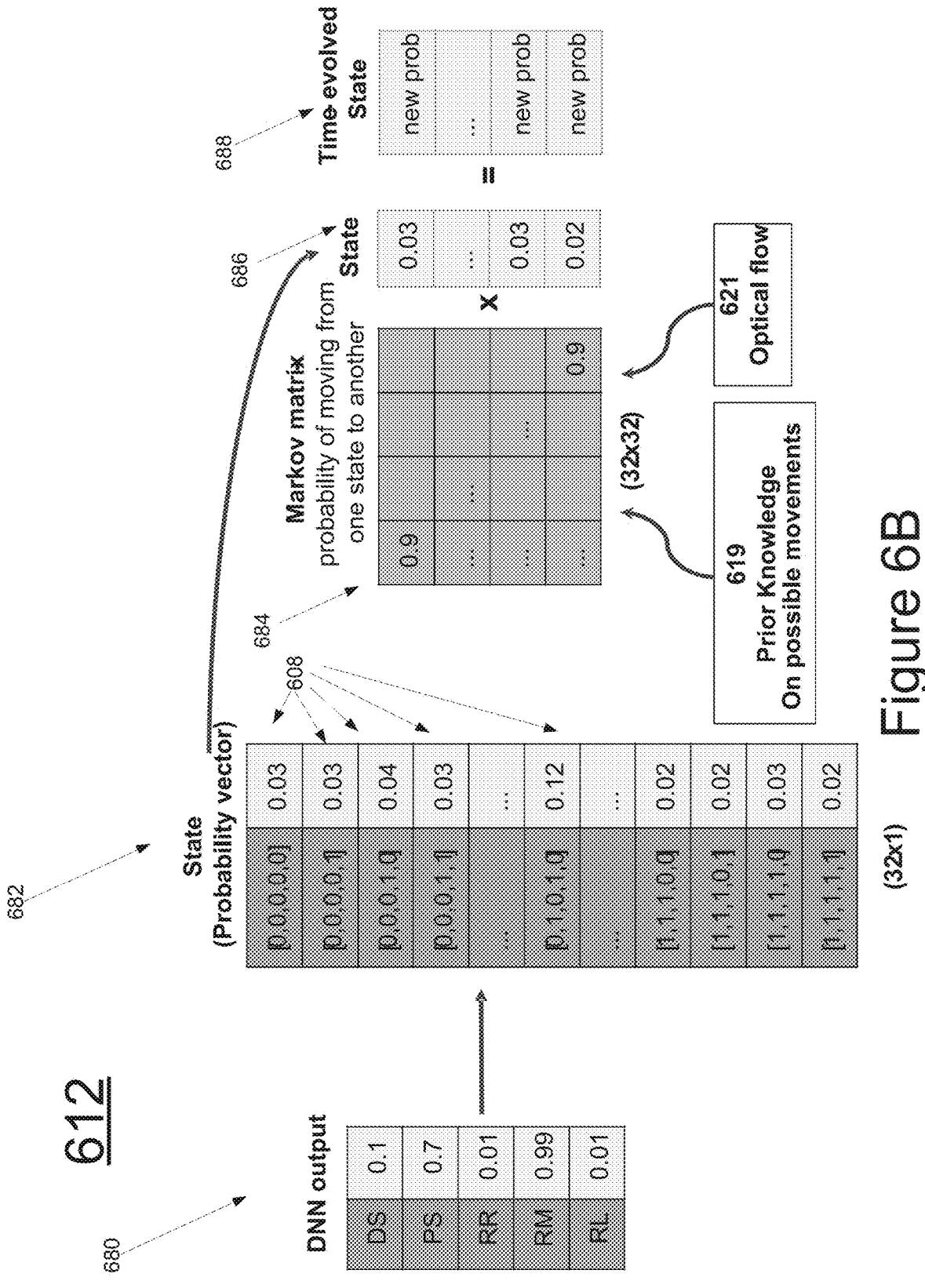
FIG. 6B illustrates an example of a fusion processing analysis algorithm used to combine predicted state and the current state of the vehicle occupancy, in accordance with some embodiments of the present disclosure.

According to one embodiment, the probability vector initialization is based on output data such as initial output data 602 which includes, for example, vehicle occupancy as captured for example by one or more sensors and analyzed by one or more processors. For example, the initial output data 602 may include resulted deep neural network (DNN)

output analysis of the vehicle occupancy based on for example one or more images captured by a sensor, e.g. video camera 245. An example of the initial output data 602 and the probability vector for a five-seat vehicle is shown in FIG. 6B. The output data 602 may be in the form of table 680 including measured DNN occupancy probability output for each of the vehicle five seats, e.g. 0.1 for the driver seat (DS) 0.7 for the passenger seat, 0.01 for the rear right seat (RR), 0.99 for the rear middle seat (RM) and 0.01 for the rear left seat (RL). Accordingly, based on DNN output table 680 a state table is initiated comprising a probability vector 682 of all possible seated or occupancy states. Additionally, uncertainty parameters 608 are measured and obtained for each slot of the probability vector for example based on the provided output data 602.

At step 610 the current state occupancy (e.g. initial state represented by the probability vector 680 and uncertainty parameters 608) and the uncertainty parameters (e.g. 1/probability) of the current state occupancy is updated using a fusion processing analysis algorithm which includes a time evolution analysis process (e.g. relating to the probability of a predicted state vehicle occupancy) and combining, for example continuously and/or in real-time, data input 615 to yield an updated state (e.g. time-evolved occupancy state 618) and updated uncertainty (e.g. time evolved uncertainty parameter 616), in accordance with embodiment. In other words, the fusion process as illustrated in step 610 includes receiving data inputs 615 comprising different multiple information and generating a prediction probability model based on the data inputs 615 to wisely consider and update a current occupancy state.

For example, a vehicle probability occupancy state (e.g. probability vector 682) is continuously updated over time based on the data inputs 615 (e.g. first data) including for example prior knowledge or data of the vehicle. Accordingly, each predication state may be weighted according to its updated uncertainty.

Nonlimiting examples of data inputs 615 may include: optical flow data which may comprise image pixels analysis (e.g. DNN analysis or NN analysis such as AFAIK optical flow) of the vehicle to provide cabin occupancy; and/or prior knowledge; and/or motion indications of objects, such as the motion of one or more passengers movements between seats. Non-limiting examples of prior knowledge may include: information on the vehicle units state such as doors/window/seatbelt state and/or prior information on objects and/or passengers in the vehicle; and/or rules or assumptions such as physical assumptions or seat transition rules relating to likelihood of movements inside the vehicle, for example, to rule out unlikely changes in the occupancy prediction or alternatively confirm expected changes in the vehicle occupancy state. Specific examples of the physical assumptions may include a high probability that the driver seat is occupied in a driving vehicle (nonautonomous vehicle) and/or low probability that a passenger may move to one of the rear seat in a predetermined short time, or from one seat to another seat in a single frame. Another specific example of the physical assumptions may be that the number of occupants does not change once the car is driving and the door is closed. This prevents loss of occupant even if he/she is momentarily hidden from the sensor. This also prevents false detections from objects being moved around inside the car (e.g. a coat etc.).

Figure 6C:
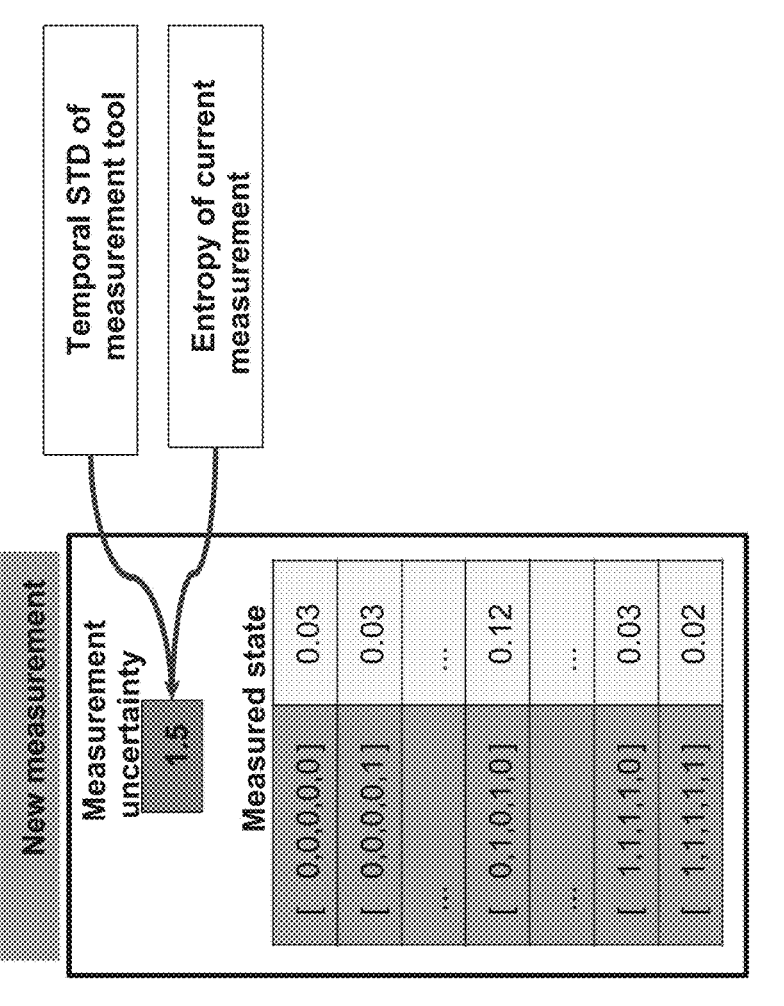
FIG. 6C illustrates an example of an updating algorithm which may be used to combine the additional information to yield an updated state and updated probability parameter of a vehicle occupancy state, in accordance with some embodiments of the present disclosure.

At step 620 the updated state 618 and uncertainly parameter 616 are continuously updated by an update algorithm 613 as shown in FIG. 6C based on additional data inputs 625 and updated measurement uncertainty parameters 627 to yield an updated state 628 and updated probability parameter 626 of a vehicle occupancy state. According to one embodiment, the update process of step 620 includes combining the additional data inputs 625 and uncertainty parameters 627 with the current occupancy state to yield the updated state 628 and updated uncertainty parameter 626 of a vehicle occupancy state.

In accordance with embodiments, the fusing method 293 loop is closed as the initial state 605 (e.g. probability vector) and uncertainty parameters 608 are accordingly and continuously updated according to the updated seat state 628 and updated uncertainty 626

FIG. 6B illustrates an example of the 612 fusion processing analysis algorithm used to combine predicted state and a current state of the vehicle occupancy to yield an accurate occupancy state of the vehicle as performed at step 610, in accordance with embodiments. The algorithm 612 may include forming a matrix, such as a Markov matrix 684, which includes a representation of the probability of changing/updating the occupancy state of the vehicle based on the received data 615 (e.g. prior knowledge of possible movements and/or optical flow). Specifically, for a five-seat vehicle, a 32×32 matrix is generated wherein each of the matrix slots represents the probability of each vehicle state to change in time to a different state based on the received data 615. Accordingly, the matrix 684 is multiplied by the current state (e.g. probability vector 686) to yield an update (time evolved) probability vector 688 of the vehicle occupancy.

For example, data including indications that all vehicle seat belts were clicked decreases the probability that one of the passengers left the vehicle. Therefore, although one or more passengers, such as passengers in the vehicle rear seat keep disappearing in a number of images, the measured probability parameter that one of the passengers left the vehicle will be low, and accordingly, the vehicle occupancy will not change.

More specifically, in a case where initially a DNN analysis identified, based on for example one or more captured images, that in a five-seat vehicle all five seats are occupied and the received prior knowledge includes information from the vehicle's sensors that none of the vehicle doors were opened and/or that all seat belts were clicked the probability of a state change is low and accordingly the matrix 684 will be an identity matrix and accordingly the new state current state equals the current state. In a case where a motion was identified the probability may increase and the matrix diagonal may be 0.9 and the new state will be accordingly updated.

FIG. 6C illustrates an example of an updating algorithm 613 which may be used to combine the additional information to yield an updated state 628 and updated probability parameter 626 of a vehicle occupancy state as performed at step 620 and illustrated hereinabove in respect to FIG. 6A. According to one embodiment, algorithm 613 includes updating the occupancy state 628 and the uncertainty parameters 626 by combining inputs of the predicted state and the current state (e.g. weighted by their uncertainties) into an updated state. In some cases, the weighted average between the current state and the updated state is calculated using Linear time-invariant (LTI) methods and specifically Infinite Impulse Response (IIR) filters. Accordingly, each additional input is considered however as time evolves historical inputs weight exponentially fades and their weight is less significant while new inputs weight is more significant.

In accordance with embodiments, the updating algorithm 613 is configured to discard input data which includes high uncertainty as eventually this data should not affect and change the current state.

According to one embodiment the updating formulas are as follow:

$$\text{Updated state} = 1 - \text{Gain} * \text{Current state} + \text{Gain} * \text{new state} \quad (1)$$

$$\text{Updated uncertainty} = (1 - \text{Gain}) * \text{State uncertainty} \quad (2)$$

Where:

$$\text{Gain} = \text{state uncertainty} / (\text{Measurement uncertainty} + \text{State uncertainty})$$

For example, in a case where the measurement uncertainty for a new measurement is zero (e.g. there is 100% certainty of the new measured state), and the state uncertainty of the current state is one. The measured gain is one. Accordingly, the updated state equals the new state and the current state will be discarded.

According to one embodiment, the measurement uncertainty level is based on the measured STD (system test description) and alternatively or in combination with the entropy of the current measurement. For example, a high STD will result in high uncertainty, however, the entropy level may affect the total measured uncertainty.

Figure 7:
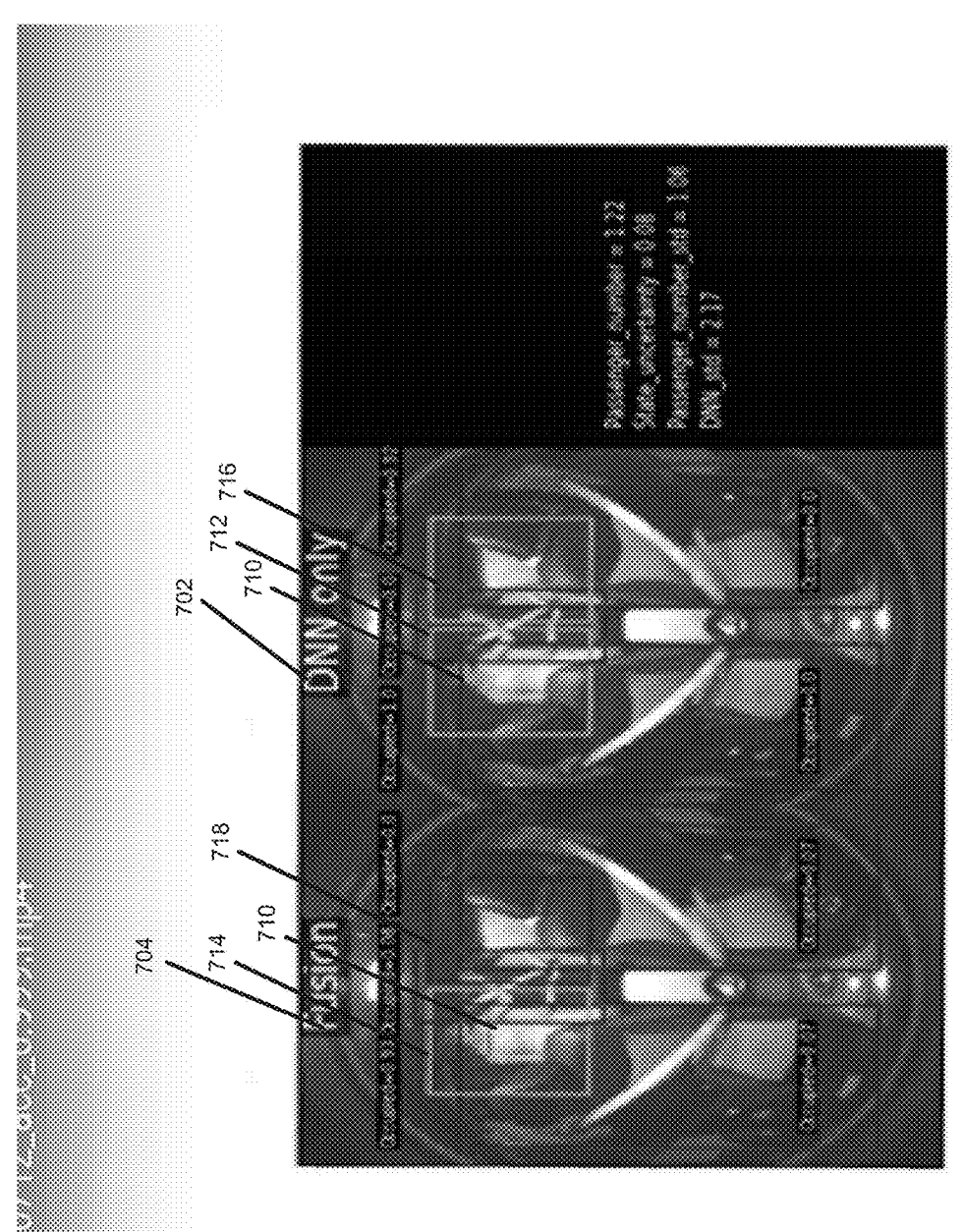
FIG. 7 shows two video images presenting a comparison between prior methods and systems which are based only on a single detection method and the present invention methods and systems which include fusing multiple detection methods, in accordance with some embodiments of the present disclosure.

FIG. 7 shows two video images 702 and 704 presenting a comparison between prior methods and a systems which are based only on a single detection method, such as DNN (e.g. image 702) and the present invention methods and systems which include fusing multiple detection methods such as DNN and face detection methods (e.g. image 704) to identify objects such as occupants in a vehicle. As shown, at the rear seats of a vehicle cabin a person 710 is identified by both detection methods and is marked by rectangles 712 and 714 as an identified passenger (marked for example yellow). However, as the passenger moves his hands to the left seat the prior methods mistakenly identify the hand as a person (e.g. marked by yellow rectangle 716) and the seats as occupied while the present invention correctly identifies the seat as uncoupled (e.g. marked as blue rectangle 718). Passenger Height or Weight Measurements According to another embodiment, there are provided methods and systems for estimating one or more measurable characteristics of objects in the vehicle such as the occupant's height; and/or weight or mass; and/or the occupants body portions size such as leg or arm length or width; and/or head diameter; and/or skin color and other characteristics. For example, the system and method may first identify the position of the passengers and then in case the passengers are identified as sitting straight, measure their height, or adjust the estimations for any other positions.

FIG. 8A shows a flowchart 800 of a method for measuring a length (e.g. height and/or width) and/or weight of an object in a vehicle cabin, in accordance with some embodiments. The object may be for example an occupant such as a passenger or driver of the vehicle. In other embodiments, the method includes different or additional steps than those described in conjunction with FIG. 8A. Additionally, in various embodiments, steps of the method may be performed in different orders than the order described in conjunction with FIG. 8A.

At step 810 one or more images such as 2D or 3D images of the vehicle cabin are obtained using, for example, the monitoring systems 110 or 210 and/or one or more sensors such as image sensors illustrated in FIG. 2A or 2B. At step 820 the one or more images are analyzed using one or more processors, such as processor 252, to identify one or more objects such as occupants and/or boxes (e.g. suitcases) in the vehicle cabin. At step 830 the height and/or width of the one or more identified objects or portions of the objects is estimated. In some cases, the height and/or width of the one or more identified objects is estimated using computer vision methods and/or neural networks. Specifically, in some cases, the identified objects are one or more persons the height of the one or more identified persons may be estimated by detecting and measuring body portions of the persons in the obtained images. For example, the width and length of the person upper part (e.g. head and torso) may be estimated by identifying the location of the top of the person, e.g. the edge of the person, for example, the top of the occupant's head, in the obtained image and comparing that location to the location of the person torso to yield a length measurement, for example in pixels, of the upper part of the occupant's body (e.g. head and torso).

Figure 8B:
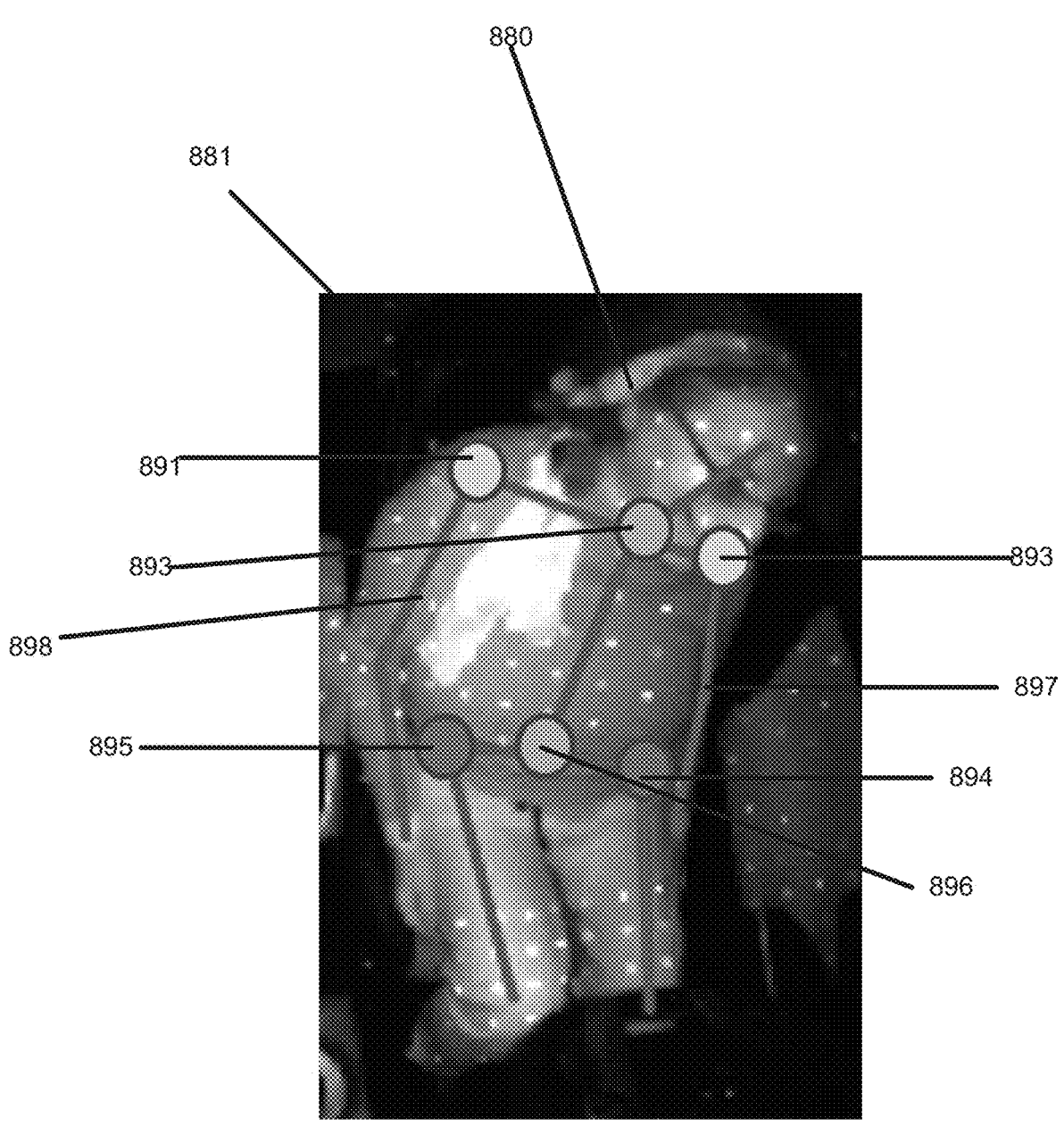
FIG. 8B shows a passenger skeleton as identified by a neural network, in accordance with some embodiments of the present disclosure.

In some cases, the method 800 may include estimating the height and width of occupants (e.g. passengers and/or driver) sitting in straightforward positions or compensate for different poses by estimating the pose of the passenger, such as whether the passenger is leaning forward or to the side. In such cases, the height and width estimations may be based on one or more geometric models or on training a neural network on a number of obtained images (e.g. 1, 2, 3, 10, 20, 30, 100 or more images) of one or more occupants sitting at different distances from the sensor and at different poses. For example, as illustrated in FIG. 8B, the method may include identifying in one or more of the obtained images, for example in image 881, a person 880 such as a passenger or driver sitting at the front seat of the vehicle. The method may further use neural networks to identify the pose of the identified person and estimate the length of the person 880 body parts. For example, the neural network can estimate the location of the person 880 body parts by identifying a number of points (e.g. key-points 891-896) and connecting the points by a number of lines such as lines 897 and 898 to create a skeleton model from these points. Measurements of the lengths or areas of body parts can be taken from such a skeleton model, such as the width of the shoulders (e.g. between points 891 and 893), the width of the hips (between points 894 and 895) or the height of the torso (between points 893 and 895. Non limiting examples of human pose estimation methods and skeleton models may include: "DeepPose: Human Pose Estimation via Deep Neural Networks by Alexander Toshev, Christian Szegedy, The IEEE Conference on Computer Vision and Pattern Recognition (CVPR), 2014, pp. 1653-1660; or Realtime Multi-Person 2D Pose Estimation using Part Affinity Fields by Zhe Cao, Tomas Simon, Shih-En Wei, Yaser Sheikh, which are incorporated herein by reference in their entirety.

At step 840 the pixels measurements, such as the body parts or upper part measurement (e.g. head and torso) may be translated from image pixels estimation into real actual measurement units such as length measurement in a metric system, for example in centimeters (e.g. distance in cm), by measuring the distance of the identified object (e.g. occupant) from the sensor (e.g. monitoring system), using, for example, range estimation methods and systems such as one or more range sensors. For example, the neural network may receive an input including an estimation of the distance to the identified object passenger obtained from a range sensor or estimate it from the image by itself.

Alternatively or in combination, the distance measurement in the image coordinates may be compared to a distance measurement of one or more known and/or identified objects in the vehicle cabin such as the passenger's seat. In such a configuration, the measurement or estimation of the distance to the occupant may not be required.

In cases where the identified objects are one or more persons, at step 850 weight (and/or mass) estimation of the identified persons may be obtained based on for example the height and/or width estimation and/or from height and width estimations obtained from a 3D imager (e.g. 3D sensor 284) that outputs the range to each pixel or sample in the image. A geometric model for estimating the weight may include for example the following Eq:

$$weight = constant * (height * width) \wedge 1.5$$

or $$weight = constant * height * width * depth.$$

Alternatively or in combination, a 2D image or a 3D image or a combination of both may be input to a neural network that may be trained to estimate the weight of the identified object from these images. In both cases, the training session may include improving the estimation in order to reduce a cost function comparing the estimation to the ground truth of the height and weight.

Baby Seat Monitoring

According to some embodiments, for example, when a rear-facing baby seat is placed in a vehicle back seats, a camera that is installed at the front section of the vehicle may not be able to monitor and identify whether there is a baby in the baby seat and may as well fail to reliably set an alarm or inform the baby parents or the vehicle driver when a baby is forgotten in the locked vehicle. In accordance with embodiments, there are provided systems, devices and methods configured for detecting the presence of subjects in a vehicle, even without a direct line of sight between the system's imaging and sensing devices. Such a system can be used in private cars and public transportation vehicles to prevent the driver from locking the vehicle in case an occupant is present (e.g. baby).

The methods and system include monitoring a baby seat and/or the area around the baby seat at the moment in which the baby is placed at the baby seat and/or the baby seat safety belt buckles are locked. The method may further include analyzing the movement of the one or more persons (e.g. the baby's parents or caregivers) who hold the baby and the time it takes them to place and lock the baby in the baby seat. Based on the measured time it takes to place and lock the baby in the baby seat and assuming this action takes longer time then placing an object such as a bag in the back seat or the baby seat, the method may identify that a baby seats in the baby seat and/or the baby seat safety belts were not locked. Accordingly, the system and method may learn to detect the sequence in which a baby is taken out of the baby seat and the car which are distinguished from the action of taking a bag out of the back seat or the baby seat.

Hence, the system and algorithm are trained to detect that a baby has been put in the back seat and not taken out and set an alarm if the car is locked and a baby is forgotten and left alone.

Figure 5A:
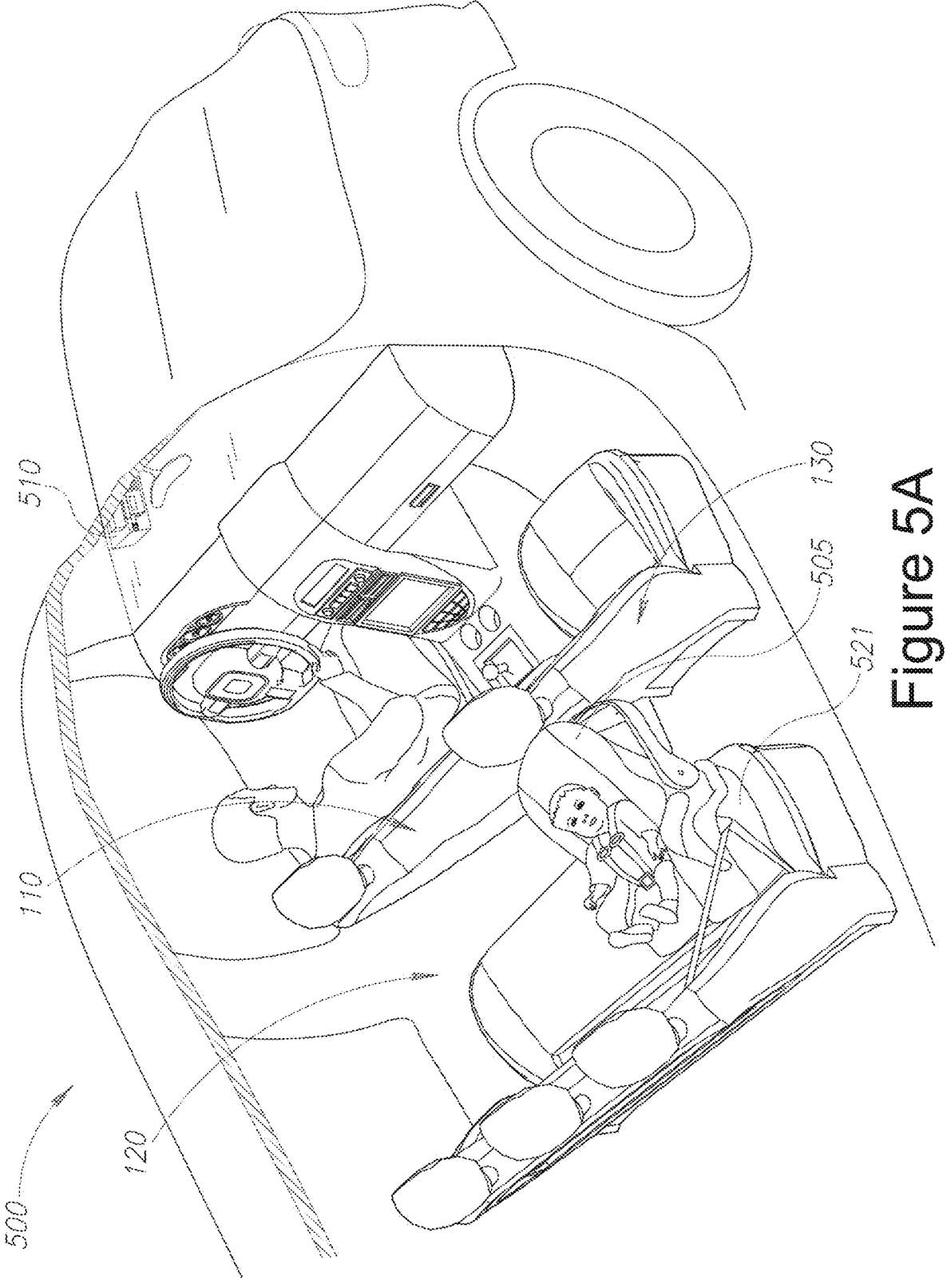
FIG. 5A is a side view of a vehicle showing the passenger compartment, or passenger container, containing a rear facing baby seat on a back passenger seat and a vehicle interior monitoring system, in accordance with some embodiments of the present disclosure.

FIG. 5A is a side view of a vehicle 500 showing the passenger compartment, or passenger container, containing a rear-facing baby seat 505 on a back passenger seat 521 and a vehicle interior monitoring system 510 in accordance with embodiments. The interior monitoring systems and methods are capable of detecting one or more of the presence of an object, occupying objects such as a box, an occupant or a rear facing baby seat 505, determining the type of object, determining the location of the object, and/or determining another property or characteristic of the object. A property of the object could be the orientation of a child seat, the velocity of an adult and the like. For example, the vehicle interior monitoring system 510 can determine that an object such as a baby is present on the seat, that the object is a child seat and that the child seat is rear-facing. The vehicle interior monitoring system could also determine that the object is an adult, that he is drunk and that he is out of position relative to the airbag. In some cases, the monitoring system 510 may be the monitoring system 110 or monitoring system 210.

FIG. 5B shows a flowchart 500 of a method for identifying a baby seat located in the rear section of a vehicle and alert in case a baby or child was forgotten at the baby seat. In other embodiments, the method includes different or additional steps than those described in conjunction with FIG. 5. Additionally, in various embodiments, steps of the method may be performed in different orders than the order described in conjunction with FIG. 5

At step 510 a baby seat placed at the back section of a vehicle cabin is identified. In some cases, the baby seat is identified by a monitoring system such as the monitoring system 110 or 210 illustrated in FIG. 1B and FIG. 2A.

At step 520 the baby seat and/or the area around the baby seat is monitored, for example by the monitoring system to output data on the baby seat and/or area around the baby seat.

At step 530 the data, including for example one or more images obtained by the monitoring system is analyzed to identify movements of one or more persons that hold the baby and data including measured time such as the time it takes them to place and lock the baby on the baby seat. In some cases, the movements and measured time are acknowledged using one or more of computer vision and machine learning algorithms as illustrated in respect to FIGS. 2A, 2B, 3, 4, 6A, 6B and 6C. In some cases, a fusing algorithm such as the fusing algorithm illustrated in FIG. 6A may be used to analyze the data and combine data such as data including images of the baby seat with additional data such as identified movements.

At step 540 the presence of the baby/child is determined based on the analyzed data, e.g. the fusing algorithm output which includes, for example, the identified movements and measured time.

Optionally at step 550 the location and/or position of the baby/child is reported and/or displayed, for example on the vehicle multimedia display and/or on a user (e.g. the baby/child parents) mobile device (e.g. mobile phone), in accordance with embodiments.

FIG. 9A is a flow diagram illustrating steps of a method 900 for detecting occupancy state, including identifying objects, such as hidden objects in a vehicle cabin and in some cases providing information on the identified objects, using a 3D skeleton model, in accordance with embodiments. For example, the method may include determining an occupancy state of one or more occupants sitting on a vehicle seats including for example at least one baby seat, for example in real-time, and accordingly outputting one or more signals to activate and/or provide information associated with the activation of one or more of the vehicles units or applications. Some stages of method 900 may be carried out at least partially by at least one computer processor, e.g., by processor 152 and/or vehicle computing unit. Respective computer program products may be provided, which comprise a computer-readable storage medium having computer-readable program embodied therewith and configured to carry out of the relevant stages of method 900. In other embodiments, the method includes different or additional steps than those described in conjunction with FIG. 9A. Additionally, in various embodiments, steps of the method may be performed in different orders than the order described in conjunction with FIG. 9A.

At step 910 data including multiple images including two or more images, for example, one or more or a sequence of 2D images, and one or more or a sequence of 3D images of the vehicle cabin are obtained, in accordance with embodiments. The obtained sequence of 2D and 3D images includes images of the vehicle cabin including one or more occupants such as a driver and/or passenger(s) seating in the vehicle rear and/or back seats. In accordance with some embodiments, the 3D images are images captured by a monitoring system such as the monitoring system 110 or 210. In some cases, the captured images may include reflected light patterns and/or ToF data and/or any stereoscopic data while the 2D images are clean original visual images that do not include additional data such as reflected light patterns. In some embodiments, the multiple images (e.g. 2D and 3D images) are captured synchronically and/or sequentially by the monitoring system 210 located in the vehicle cabin, for example at the front section of the vehicle as illustrated in FIG. 1A. In some cases, the images are obtained and processed in real-time.

At step 920 one or more pose detection algorithms are applied on the obtained sequence of 2D images to detect the pose and orientation of the occupants in the vehicle cabin. Specifically, the pose detection algorithms are configured to identify and/or measure features such as position; orientation; body organs; length and width of the occupants. For example, the position and orientation of the object may be detected and measured by applying an OpenPose algorithm on the images and/or Dense-pose. Specifically, in accordance with embodiments, a Neural Network such as a DNN (Deep Neural Network) is applied for each obtain 2D image over time (t) to generate (e.g. superpose) a skeleton layer on each identified occupant. The skeleton layer may comprise multiple key-points locations that describe the occupant's joints. In other words, the key-points represent body landmarks (e.g. joint body points) which are detected at the captured body image forming the skeleton representation as shown in FIG. 8B. In accordance with embodiments, each key-point of the skeleton representation includes an identified coordinate (x, y) at the occupant(s) body image to be used for extracting features of the identified occupants.

In some embodiments, the pose estimation methods may be further used to identify the occupants and/or occupant's seat in each of the obtained 2D images.

In some embodiments, the pose estimation methods are configured to extract one or more features of the occupants and/or the occupant's surroundings such as the occupant's body parts and the locations of the occupant's seat.

In some embodiments, the identified occupants are separated from one another to yield a separate image for each identified occupant. In some embodiments, each separated image includes the identified occupant and optionally the occupant surroundings such as the occupant's seat.

In some embodiments, each obtained 2D image of the sequence of 2D images is divided based on the number of identified occupants in the image so a separated skeleton is generated for each identified occupant.

In some embodiments, a confidence grade is assigned to each estimated key-point is space (e.g. vehicle cabin).

At step 930 the sequence of 3D images is analyzed to generate one or more depth map representations of the occupants and/or the vehicle's cabin, in accordance with embodiments. As mentioned, the captured 3D images may be any type of stereoscopic images of the occupants such as illuminated with the structured light include specific pattern features that correspond to the illumination patterns projected onto the object. The pattern features can be stripes, lines, dots or other geometric shapes, and includes uniform or non-uniform characteristics such as shape, size, and intensity. An example captured image illuminated with specific structured light (e.g. dots) is described in FIG. 8B. In some cases, the 3D images may be RF images or the like.

At step 940, the 3D map representations and the skeleton annotation layers of each occupant for each image are combined to yield one or more 3D skeleton models for one or more, for example for each occupant, in accordance with embodiments. Generally, the generated skeleton models are used to identify the orientation/pose/distance of the occupants in the obtained images from the imaging device. Specifically, each of skeleton models includes data such as 3D key points (x,y,z) representation of the occupants in respect to a X-Y-Z coordinate system, where the (x,y) point represent the location at the occupants body joins surface in the obtained images and (z) represent the distance of the related (x, y) key-point surface from the image sensor.

It should be stressed that while steps 730 and 740 of FIG. 7A includes obtaining reflected light pattern images to yield depth data for each image, the present invention may include obtaining 3D images and/or extracting depth data by any type of 3D systems, devices and methods, such as stereoscopic cameras and/or ToF sensors and/or RF sensors as known in the art.

At step 950 a prediction model is generated based on the skeleton models to detect the occupancy state of the vehicle (e.g. the number of occupants in the vehicle), for example in real-time. Specifically, the analysis includes detecting and/or counting the number of occupants in the vehicle as mentioned herein with respect to FIGS. 3 and 4 (e.g. steps 330 or 420). For example, the analysis may include detecting and counting (e.g. in real-time) the number of passengers in the vehicle based on the total number of the identified skeleton model representation of each identified occupant.

In some cases, the skeleton models may be analyzed to extract one or more features of the occupants. In an embodiment, the extracted features may include data such as measured pose and/or orientation of each occupant in the vehicle. In some embodiments, the features may further include the length of one or more body parts of the occupants, such as major body parts of the occupant, e.g., shoulders, hips, torso, legs, body, etc., as illustrated for example in FIG. 8A. Advantageously, the generated skeleton model provides the "real length" (e.g. or actual length) of each body portion as opposed to "projected length" that can be obtained if only 2D images of the persons were obtained. The analysis based on the 3D data improves the accuracy of the identification of the occupants since the "projected length" is very limited in providing occupancy estimation (e.g. sensitive for angle etc.) For example, as shown in FIG. 7B the obtained image 780 comprising the reflected light pattern of dots and the skeleton superposed on the image of the passenger seating at the vehicle front or back seats are analyzed to estimate the length of the person body parts, e.g. shoulders, hips, torso, legs, body etc.

In accordance with embodiments, the prediction model may include or may be stochastic prediction model (e.g. Markov chain, for example in the form of a Markov matrix) of one or more predicted occupancy states probabilities based on the generated 3D skeleton which identified the one or more occupants in the vehicle, for example over time. The prediction model is used to continuously update over time the probability of one or more current occupancy states (e.g. probability vector) to yield an updated occupancy state, e.g. determine in real-time the location of objects 271 and 272 and/or the number of objects in the vehicle cabin. In some cases, the predicted state and the current state are combined by weighting their uncertainties using, for example, Linear Time-Invariant (LTI) methods such as Infinite Impulse Response (IIR) filters. Once the body or body parts are detected, the objects are tracked at step 294. For example, the objects may be tracked in the 2D image or the depth image using conventional trackers such as correlation trackers and edge trackers. A detailed description of the fusing algorithm and prediction model is described hereinbelow in respect to FIGS. 6A, 6B and 6C.

According to one embodiment, based on determined occupancy state the processor 252 may output data or signals which may be used to provide information and/or for controlling devices, units or applications in the vehicle, which may be remote or integral to the vehicle, for example, an electronic device such as an alarm, alert or a lighting may alert on out-of-position and accordingly activate an occupant protection apparatus (e.g. airbag), the vehicle's entertainment may be configured according to the identified passenger or driver which was identified by the monitor system as the one who activates the device, and/or other devices. The related device or unit may be controlled, such as activated or modulated, by the signal output according to embodiments.

In some cases, the output signals may include seat belt reminder (SBR), out of position indication (OOP) for example for airbags suppression and driver monitoring system (DMS) for driver's alert. Other types of data and/or signals provided by the system or the processor 252 are described with reference to FIG. 1B.

In some cases, the one or more skeleton models or 3D skeleton models of each occupant are analyzed to filter out (e.g. removed or deleted), one or more skeleton models, based on for example predefined filtering criteria, and yield valid skeleton models (e.g. suitable for mass estimation) of the occupants, in accordance with embodiments. The predefined filtering criteria include selection rules which define a required pose and orientation for estimating the occupant's mass. For example, the predefined filtering criteria include selection rules which define 'abnormal' or 'non-valid' pose or orientation of the occupants. An 'abnormal' pose or orientation may defined as an occupant's pose or orientation where a full or almost full skeleton representation is not presented or imaged due for example of nonstandard sitting position of the occupant or as a result of imaging the occupant in an angle in respect to the image sensor where the occupant may not be completely seen. In some cases, the nonstandard pose may relate to a pose where the occupant is not sitting straight, for example in a bending position. Accordingly, the analysis of these 'abnormal' skeleton representations is used to discard poses defined as 'abnormal' (e.g. inaccurate or false measurement) and therefore these skeletons are omitted from the mass estimation process. Nonlimiting examples of filtering criteria include defined spatial relation between skeleton features of the identified objects and/or identified abnormal poses. Nonlimiting examples of discarded poses are illustrated in FIGS. 5A and 5B.

In some cases, the analyzed images may be filtered using a pose density model method. In accordance with embodiments, the pose density model method includes placing each of the object's skeleton configuration in a high-dimensional space and discarding any configurations which are within a predetermined distance from a high-density area in this space.

In some cases, the valid skeleton models of the occupants are analyzed to detect the occupancy state of the vehicle, in accordance with embodiments. In some embodiments, the analysis process includes inserting the extracted number of valid skeleton models to measurement models such as a pre-trained regression model configured to estimate the occupancy state in time (t) of the occupants based on current and previous (t–1) occupancy measurements. In some cases, the estimation model is a machine learning estimation model configured to determine the occupancy state. In some cases, the measurement model is configured to provide a continuous value of a predicted occupancy, or perform a coarser estimation and classify the occupant according to mass class (e.g. child, small adult, normal, big adult).

In some cases, the measurement model may be or may include the fusing algorithm as illustrated in FIGS. 6A, 6B and 6C. According to some embodiments, the fusing process includes using fusing algorithms to combine two or more types of data inputs such as face detection data, optical flow data, skeleton models and/or prior knowledge.

FIG. 9B is a flow diagram illustrating steps of a method 960 detecting occupancy state, including identifying objects, such as hidden objects in a vehicle cabin and in some cases providing information on the identified objects, using a 2D skeleton model, in accordance with embodiments. For example, the method may include determining an occupancy state of one or more occupants sitting on a vehicle seats including for example at least one baby seat, for example in real-time, and accordingly outputting one or more signals to activate and/or provide information associated with the activation of one or more of the vehicles units or applications. Some stages of method 960 may be carried out at least partially by at least one computer processor, e.g., by processor 152 and/or vehicle computing unit. Respective computer program products may be provided, which comprise a computer-readable storage medium having computer-readable program embodied therewith and configured to carry out of the relevant stages of method 960. In other embodiments, the method includes different or additional steps than those described in conjunction with FIG. 9A. Additionally, in various embodiments, steps of the method may be performed in different orders than the order described in conjunction with FIG. 9B.

At step 970 data including one or more images including, for example, a single 2D image or a sequence of 2D images or various 2D images of the vehicle cabin are obtained, in accordance with embodiments. The obtained 2D images (e.g. a sequence of 2D images or single 2D image) include image(s) of the vehicle cabin including one or more occupants such as a driver and/or passenger(s) seating in the vehicle rear and/or back seats. In accordance with some embodiments, the 2D images are images captured by a monitoring system such as the monitoring system 110 or 210. In some cases, the captured 2D images may include reflected light pattern and/or ToF data. In some cases, the 2D images are clean original visual images that do not include additional data such as reflected light patterns. In some embodiments, one or more 2D images are captured synchronically and/or sequentially by the monitoring system 210 located in the vehicle cabin, for example at the front section of the vehicle as illustrated in FIG. 1A. In some cases, the images are obtained and processed in real-time.

At step 980 one or more pose detection algorithms are applied on the obtained 2D images to detect the pose and orientation of the occupants in the vehicle cabin. Specifically, the pose detection algorithms are configured to identify and/or measure features such as position; orientation; body organs; length and width of the occupants. For example, the position and orientation of the object may be detected and measured by applying an OpenPose algorithm on the images and/or Dense-pose. Specifically, in accordance with embodiments, a Neural Network such as a DNN (Deep Neural Network) is applied for each obtain 2D image over time (t) to generate (e.g. superpose) a skeleton layer (e.g. 2D skeleton layer or 2D skeleton model) on each identified occupant. The skeleton layer may comprise multiple key-points locations that describe the occupant's joints. In other words, the key-points represent body landmarks (e.g. joint body points) which are detected at the captured body image forming the skeleton 2D representation as shown in FIG. 8B. In accordance with embodiments, each key-point of the skeleton representation includes an identified coordinate (x, y) at the occupant(s) body image to be used for extracting features of the identified occupants.

In some embodiments, the 2D skeleton layer placed on or above on one or more or each occupant of the obtained 2D images to generate a 2D skeleton representation of the vehicle occupants.

In some embodiments, the pose estimation methods may be further used to identify the occupants and/or occupant's seat in each of the obtained 2D images.

In some embodiments, the pose estimation methods are configured to extract one or more features of the occupants and/or the occupant's surroundings such as the occupant's body parts and the locations of the occupant's seat.

In some embodiments, the identified occupants are separated from one another to yield a separate image for each identified occupant. In some embodiments, each separated image includes the identified occupant and optionally the occupant surroundings such as the occupant's seat.

In some embodiments, each obtained 2D image of the sequence of 2D images is divided based on the number of identified occupants in the image so a separated skeleton is generated for each identified occupant.

In some embodiments, a confidence grade is assigned to each estimated key-point is space (e.g. vehicle cabin).

At step 990 the generated skeleton models are analyzed to detect the occupancy state of the vehicle (e.g. the number of occupants in the vehicle), for example in real-time. Specifically, the analysis includes detecting and/or counting the number of occupants in the vehicle as mentioned herein in respect to FIGS. 3 and 4 (e.g. steps 330 or 420). For example, the analysis may include detecting and counting (e.g. in real-time) the number of passengers in the vehicle based on the total number of the identified skeleton model representation of each identified occupant.

In some cases, the skeleton models may be analyzed to extract one or more features of the occupants. In an embodiment, the extracted features may include data such as measured pose and/or orientation of each occupant in the vehicle. In some embodiments, the features may further include the length of one or more body parts of the occupants, such as major body parts of the occupant, e.g., shoulders, hips, torso, legs, body, etc., as illustrated for example in FIG. 8A. Advantageously, the generated skeleton model provides the "real length" (e.g. or actual length) of each body portion as opposed to "projected length" that can be obtained if only 2D images of the persons were obtained. The analysis based on the 3D data improves the accuracy of the identification of the occupants since the "projected length" is very limited in providing occupancy estimation (e.g. sensitive for angle etc.) For example, as shown in FIG. 7B the obtained image 780 comprising the reflected light pattern of dots and the skeleton superposed on the image of the passenger seating at the vehicle front or back seats are analyzed to estimate the length of the person body parts, e.g. shoulders, hips, torso, legs, body etc.

In accordance with embodiments, the prediction model may include or may be stochastic prediction model (e.g. Markov chain, for example in the form of a Markov matrix) of one or more predicted occupancy states probabilities based on the generated 3D skeleton which identified the one or more occupants in the vehicle, for example over time. The prediction model is used to continuously update over time the probability of one or more current occupancy state (e.g. probability vector) to yield an updated occupancy state, e.g. determine in real-time the location of objects 271 and 272 and/or the number of objects in the vehicle cabin. In some cases, the predicted state and the current state are combined by weighting their uncertainties using, for example, Linear Time-Invariant (LTI) methods such as Infinite Impulse Response (IIR) filters. Once the body or body parts are detected, the objects are tracked at step 294. For example, the objects may be tracked in the 2D image or the depth image using conventional trackers such as correlation trackers and edge trackers. A detailed description of the fusing algorithm and prediction model is described herein below in respect to FIGS. 6A, 6B and 6C.

According to one embodiment, based on determined occupancy state the processor 252 may output data or signals which may be used to provide information and/or for controlling devices, units or applications in the vehicle, which may be remote or integral to the vehicle, for example, an electronic device such as an alarm, alert or a lighting may alert on out-of-position and accordingly activate an occupant protection apparatus (e.g. airbag), the vehicle's entertainment may be configured according to the identified passenger or driver which was identified by the monitor system as the one who activates the device, and/or other devices. The related device or unit may be controlled, such as activated or modulated, by the signal output according to embodiments.

According to one embodiment, based on determined occupancy state the processor 252 may output data or signals which may be used to provide information and/or for controlling devices, units or applications in the vehicle, which may be remote or integral to the vehicle, for example, an electronic device such as an alarm, alert or a lighting may alert on out-of-position and accordingly activate an occupant protection apparatus (e.g. airbag), the vehicle's entertainment may be configured according to the identified passenger or driver which was identified by the monitor system as the one who activates the device, and/or other devices. The related device or unit may be controlled, such as activated or modulated, by the signal output according to embodiments.

In some cases, the output signals may include seat belt reminder (SBR), out of position indication (OOP) for example for airbags suppression and driver monitoring system (DMS) for driver's alert. Other types of data and/or signals provided by the system or the processor 252 are described with reference to FIG. 1B.

In some cases, the one or more skeleton models of each occupant are analyzed to filter out (e.g. removed or deleted), one or more skeleton models, based on for example predefined filtering criteria, and yield valid skeleton models (e.g. suitable for mass estimation) of the occupants, in accordance with embodiments. The predefined filtering criteria include selection rules which define a required pose and orientation for estimating the occupant's mass. For example, the predefined filtering criteria include selection rules which define 'abnormal' or 'non-valid' pose or orientation of the occupants. An 'abnormal' pose or orientation may defined as an occupant's pose or orientation where a full or almost full skeleton representation is not presented or imaged due for example of nonstandard sitting position of the occupant or as a result of imaging the occupant in an angle in respect to the image sensor where the occupant may not be completely seen. In some cases, the nonstandard pose may relate to a pose where the occupant is not sitting straight, for example in a bending position. Accordingly, the analysis of these 'abnormal' skeleton representations is used to discard poses defined as 'abnormal' (e.g. inaccurate or false measurement) and therefore these skeletons are omitted from the mass estimation process. Nonlimiting examples of filtering criteria include defined spatial relation between skeleton features of the identified objects and/or identified abnormal poses. Nonlimiting examples of discarded poses are illustrated in FIGS. 5A and 5B.

In some cases, the analyzed images may be filtered using a pose density model method. In accordance with embodiments, the pose density model method includes placing each of the object's skeleton configuration in a high-dimensional space and discarding any configurations which are within a predetermined distance from a high-density area in this space.

In some cases, the valid skeleton models of the occupants are analyzed to detect the occupancy state of the vehicle, in accordance with embodiments. In some embodiments, the analysis process includes inserting the extracted number of valid skeleton models to measurement models such as a pre-trained regression model configured to estimate the occupancy state in time (t) of the occupants based on current and previous (t−1) occupancy measurements. In some cases, the estimation model is a machine learning estimation model configured to determine the occupancy state. In some cases, the measurement model is configured to provide a continuous value of a predicted occupancy, or perform a coarser estimation and classify the occupant according to mass class (e.g. child, small adult, normal, big adult).

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smart-phones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object-oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of that additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for detecting the number of occupants in a vehicle having an interior passenger compartment, the system comprising:
    an image sensor for capturing one or more images of the occupants; and
    at least one processor in communication with the image sensor, the at least one processor configured to:
        obtain data including the one or more images of the occupants;
        apply one or more pose detection algorithms on said one or more images to yield one or more skeleton models, respectively, for each or one or more occupants of said occupants; and
        generate a prediction model based on the one or more skeleton models to detect the number of occupants in said vehicle.

2. The system of claim 1, wherein said one or more images comprise two-dimensional (2D) images and wherein said one or more skeleton models are 2D skeleton models.

3. The system of claim 2, wherein said obtained data comprise two or more images and wherein said two or more images comprise two-dimensional (2D) images and three-dimensional (3D) images of said interior passenger compartment and wherein said processor is configured to:
    analyze the 3D images to generate one or more depth map representations of the occupants;
    combine the depth map representations with the generated depth map representations to yield one or more 3D skeleton models of said occupants; and
    analyze said one or more 3D skeleton models to detect the number of occupants in said vehicle.

4. The system of claim 3, wherein said prediction model is a fusing algorithm.

5. The system of claim 4, wherein said fusing algorithm comprises combining two or more types of data inputs.

6. The system of claim 5, wherein said two or more types of data inputs include said one or more skeleton models and one or more of optical flow data or face detection data.

7. The system of claim 1, wherein the processor is configured to analyze the skeleton models based on predefined filtering criteria to remove invalid skeleton models.

8. The system of claim 1, wherein the analysis of said one or more skeleton models to detect the number of occupants in said vehicle comprises inserting the generated skeleton models to the prediction model, said prediction model is configured to estimate the number of occupants in time (t) based on current and previous (t−1) occupancy measurements.

9. The system of claim 1, wherein said prediction model is a stochastic model.

10. The system of claim 9, wherein said stochastic model is in the form of a Markov chain, or Markov matrix.

11. The system of claim 1, wherein the processor is further configured to:
    analyze additional data of said interior passenger compartment to yield predicted probabilities of said occupancy state of said vehicle, wherein each probability of said predicted probabilities relate to the probability of changing said current occupancy state to different occupancy state;
    combine said current at least one probability of the current occupancy state with said predicted probabilities of said occupancy state to yield an updated probability of an updated occupancy state of said vehicle;
    determine said current occupancy state based on said updated probability of an updated occupancy state of said vehicle; and
    generate an output to control one or more devices or applications based on the determined occupancy state.

12. The system of claim 11, wherein the at least one probability of a current occupancy state of said vehicle is in the form of a probability vector and the predicted probabilities of said occupancy state of said vehicle are in the form of a matrix.

13. The system of claim 12, wherein said probability vector is multiplied by said matrix to yield the updated probability of an updated occupancy state of said vehicle.

14. The system of claim 11, wherein said additional data is obtained from one or more of: prior knowledge of possible movements in said vehicle; 2D or 3D images of the interior passenger compartment; RF images; identified vibrations of one or more objects; identified micro-vibrations; speckle pattern analysis.

15. A method for detecting the number of occupants in a vehicle having an interior passenger compartment, the method comprising:
    using at least one processor to:
        obtain data including one or more images of said occupants;
        apply one or more pose detection algorithms on said one or more images to yield one or more skeleton models, respectively, for each or one or more occupants of said occupants; and
        generate a prediction model based on the one or more skeleton models to detect the number of occupants in said vehicle.

16. The method of claim 15, wherein said one or more images comprise two-dimensional (2D) images and wherein said one or more skeleton models are 2D skeleton models.

17. The method of claim 16, wherein said obtained data comprise two or more images and wherein said two or more images comprise two-dimensional (2D) images and three-dimensional (3D) images of said interior passenger compartment and wherein said processor is configured to:
    analyze the 3D images to generate one or more depth map representations of the occupants;
    combine the depth map representations with the generated depth map representations to yield one or more 3D skeleton models of said occupants; and
    analyze said one or more 3D skeleton models to detect the number of occupants in said vehicle.

18. The method of claim 15, wherein the analysis of said one or more skeleton models to detect the number of occupants in said vehicle comprises inserting the generated skeleton models to the prediction model, said prediction model is configured to estimate the number of occupants in time (t) based on current and previous (t−1) occupancy measurements.

19. The method of claim 15, wherein the processor is further configured to:

analyze additional data of said interior passenger compartment to yield predicted probabilities of said occupancy state of said vehicle, wherein each probability of said predicted probabilities relates to the probability of changing said current occupancy state to different occupancy state;

combine said current at least one probability of the current occupancy state with said predicted probabilities of said occupancy state to yield an updated probability of an updated occupancy state of said vehicle;

determine said current occupancy state based on said updated probability of an updated occupancy state of said vehicle; and generate an output to control one or more devices or applications based on the determined occupancy state.

20. A non-transitory computer readable storage medium storing computer program instructions, the computer program instructions when executed by a computer processor causes the processor to perform the steps of:

obtain data including one or more images of said occupants;

apply one or more pose detection algorithms on said one or more images to yield one or more skeleton models, respectively, for each or one or more occupants of said occupants; and generate a prediction model based on the one or more skeleton models to detect the number of occupants in a vehicle having an interior passenger compartment.

* * * * *